(12) United States Patent
Grochowski et al.

(10) Patent No.: US 10,585,667 B2
(45) Date of Patent: *Mar. 10, 2020

(54) METHOD AND SYSTEM TO PROVIDE USER-LEVEL MULTITHREADING

(71) Applicant: Intel Corporation, Santa Clara, CA (US)

(72) Inventors: Edward Grochowski, San Jose, CA (US); Hong Wang, Santa Clara, CA (US); John P. Shen, San Jose, CA (US); Perry H. Wang, San Jose, CA (US); Jamison D. Collins, San Jose, CA (US); James Held, Portland, OR (US); Partha Kundu, Palo Alto, CA (US); Raya Leviathan, Saviyon (IL); Tin-Fook Ngai, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/900,030

(22) Filed: Feb. 20, 2018

(65) Prior Publication Data
US 2018/0307484 A1 Oct. 25, 2018

Related U.S. Application Data

(63) Continuation of application No. 15/088,043, filed on Mar. 31, 2016, now Pat. No. 9,952,859, which is a (Continued)

(51) Int. Cl.
*G06F 9/30* (2018.01)
*G06F 9/38* (2018.01)

(52) U.S. Cl.
CPC ........ *G06F 9/30003* (2013.01); *G06F 9/3009* (2013.01); *G06F 9/3013* (2013.01);
(Continued)

(58) Field of Classification Search
None
See application file for complete search history.

(56) References Cited

U.S. PATENT DOCUMENTS 5,481,706 A 1/1996 Peek
5,485,626 A 1/1996 Lawlor et al.
(Continued)

FOREIGN PATENT DOCUMENTS

CN 1384431 A 12/2002
EP 0602345 A1 6/1994
(Continued)

OTHER PUBLICATIONS

Notification of Reasons for Refusal from foreign counterpart Japanese Patent Application No. 2012-095473, dated Sep. 17, 2013, 4 pages.
(Continued)

*Primary Examiner* — Eric Coleman
(74) *Attorney, Agent, or Firm* — Nicholson De Vos Webster & Elliott LLP

(57) ABSTRACT

A method and system to provide user-level multithreading are disclosed. The method according to the present techniques comprises receiving programming instructions to execute one or more shared resource threads (shreds) via an instruction set architecture (ISA). One or more instruction pointers are configured via the ISA; and the one or more shreds are executed simultaneously with a microprocessor, wherein the microprocessor includes multiple instruction sequencers.

18 Claims, 7 Drawing Sheets

Related U.S. Application Data continuation of application No. 13/722,481, filed on Dec. 20, 2012, now Pat. No. 9,442,721, which is a continuation of application No. 10/816,103, filed on Mar. 31, 2004, now Pat. No. 9,189,230.

(52) U.S. Cl.
CPC ...... *G06F 9/30087* (2013.01); *G06F 9/30101* (2013.01); *G06F 9/384* (2013.01); *G06F 9/3851* (2013.01)

(56) References Cited

U.S. PATENT DOCUMENTS

| | | | |
|---|---|---|---|
| 5,511,192 A | 4/1996 | Shirakihara | |
| 5,845,129 A | 12/1998 | Wendorf et al. | |
| 5,913,059 A | 6/1999 | Torii | |
| 5,991,790 A | 11/1999 | Shah et al. | |
| 6,009,522 A | 12/1999 | Klein | |
| 6,079,010 A * | 6/2000 | D'Arcy | G06F 9/30196 712/212 |
| 6,092,175 A | 7/2000 | Levy et al. | |
| 6,223,208 B1 | 4/2001 | Kiefer et al. | |
| 6,233,599 B1 | 5/2001 | Nation et al. | |
| 6,243,860 B1 | 6/2001 | Holland | |
| 6,324,623 B1 | 11/2001 | Carey | |
| 6,378,067 B1 | 4/2002 | Golliver et al. | |
| 6,418,460 B1 | 7/2002 | Bitar et al. | |
| 6,438,679 B1 * | 8/2002 | Sollars | G06F 9/30134 712/208 |
| 6,463,527 B1 | 10/2002 | Vishkin | |
| 6,567,091 B2 | 5/2003 | Dye et al. | |
| 6,622,155 B1 | 9/2003 | Haddon et al. | |
| 6,678,818 B1 * | 1/2004 | Cofler | G06F 9/30149 712/210 |
| 6,952,751 B1 | 10/2005 | Gulick | |
| 6,976,155 B2 | 12/2005 | Drysdale et al. | |
| 7,134,119 B2 * | 11/2006 | Nevill | G06F 9/30101 717/139 |
| 7,149,878 B1 * | 12/2006 | Jensen | G06F 9/30076 712/209 |
| 7,313,676 B2 | 12/2007 | Brekelbaum et al. | |
| 7,376,954 B2 | 5/2008 | Kissell | |
| 7,398,374 B2 | 7/2008 | Delano | |
| 7,480,706 B1 | 1/2009 | Hooper et al. | |
| 7,519,800 B2 * | 4/2009 | Michaelis | G06F 9/30145 712/13 |
| 7,707,389 B2 | 4/2010 | Banerjee et al. | |
| RE43,248 E * | 3/2012 | Nevill | G06F 9/30181 712/209 |
| 8,769,508 B2 * | 7/2014 | Patel | G06F 9/30174 717/136 |
| 2001/0056456 A1 | 12/2001 | Cota-Robles | |
| 2002/0078122 A1 | 6/2002 | Joy et al. | |
| 2003/0028755 A1 | 2/2003 | Ohsawa et al. | |
| 2003/0033509 A1 | 2/2003 | Leibholz et al. | |
| 2003/0126416 A1 | 7/2003 | Marr et al. | |
| 2006/0005200 A1 * | 1/2006 | Vega | G06F 12/10 718/108 |

FOREIGN PATENT DOCUMENTS

| | | |
|---|---|---|
| EP | 0602359 A2 | 6/1994 |
| EP | 0947926 A2 | 10/1999 |
| GB | 2338094 A | 12/1999 |
| JP | H0460864 A | 2/1992 |
| JP | H0736713 A | 2/1995 |
| JP | H113232 A | 1/1999 |
| JP | H11503846 A | 3/1999 |
| JP | H11353305 A | 12/1999 |
| JP | 2000207233 A | 7/2000 |
| JP | 2001005720 A | 1/2001 |
| TW | 476915 B | 2/2002 |
| TW | 554287 B | 9/2003 |
| WO | 2005098624 A1 | 10/2005 |

OTHER PUBLICATIONS

Notification of Reasons for Rejection from foreign counterpart Japanese Patent Application No. 2014-048903, dated Sep. 1, 2015, 7 pages.

Notification of Reasons for Rejection from foreign counterpart Japanese Patent Application No. 2014-154360, dated Oct. 27, 2015, 5 pages.

Office Action from foreign counterpart German Patent Application No. 112005000706.5, dated Dec. 19, 2007, 6 pages.

Office Action from foreign counterpart Japanese Patent Application No. 2014-185017, dated Aug. 4, 2015, 3 pages. (English Translation only available).

Office Action Received for Chinese Patent Application No. 2005800100530 dated Jul. 27, 2007, 21 Pages of Office Action including English Translation.

Office Action Received for Chinese Patent Application No. 200580010053.0 dated Oct. 29, 2010, 12 Pages of Office Action including English Translation.

Office Action Received for German Patent Application No. 11 2005 000 706. 5-53 dated Jan. 13, 2010, 5 Pages of Office Action including English Translation.

Office Action Received for German Patent Application No. 11 2005 000 706. 5-53 dated Jun. 5, 2009, 6 Pages of Office Action including English Translation.

Office Action Received for Japanese Patent Application No. 2007-506565 dated Aug. 31, 2010, 6 Pages of Office Action including English Translation.

Office Action Received for Japanese Patent Application No. 2007-506565 dated Mar. 24, 2009, 9 Pages of Office Action including English Translation.

Office Action Received for Taiwan Patent Application No. 94110320 dated Dec. 21, 2007, 6 Pages of English Translation.

Patterson, David and Hennessy, John "Computer Architecture: A Quantitative Approach"_ Morgan Kaufmann Publishers, Third Edition, May 17, 2002, pp. 215-219.

Patterson, David Hennessey, John. "Computer Architecture: A Quantitative Approach", Morgan Kaufmann Publishers, Third Edition, May 17, 2002. pp. 608-611.

Redstone et al., "Mini-threads: Increasing TLP on Small-Scale SMP Processors", High-Performance Computer Architecture, 2003, HPCA-9 2003, Proceedings. The Ninth International Symposium on, IEEE, Feb. 12, 200e pp. 1-14E.

Sasada et al., "Implementation and Evaluation of a Thread Library for Multi-threaded Architecture", Proceedings of the Symposium on Advanced Computing System and Infrastructure (SACSIS) 2003, Information Processing Society Japan (IPSJ), May 28, 2003, vol. 2003, No. 9, pp. 1-9/E.

Sato et al, "Process Management of the Operating System "Future" for on Chip Multithreaded Architecture", Proceedings of Computer System Symposium, Japan, Information Processing Society of Japan, Dec. 11, 2003, vol. 2001, No. 20, pp. 1-15/E.

Sato M., et al., "Process Management of the Operating System "Future" for on Chip Multithreaded Architecture," Journal of Information Processing Society of Japan, Japan, Information Processing Society of Japan, Mar. 15, 2004, vol. 45, SIG3 (ACS5), pp. 38-49.

Second Office Action and Search Report from foreign counterpart Chinese Patent Application No. 201210105283.7 , dated Dec. 25, 2014, 17 pages.

Sites R.L., et al., "Alpha AXP Architecture," Digital Technical Journal, vol. 4 (4), Special Issue 1992, 40 pages.

Sri Ram, Parthasarathy, et al., "MPEG-2 Video Decompression on a Multi-Processing VLIW Microprocessor", Sun Microsystems, Inc., 901 San Antonio Road, Palo Alto, CA 94303, USA, Presented at ICCE, Jun. 2000, Los Angeles, CA USA, (c) IEEE 2000, p. 2.

Suresh, "PERL—A Registerless Architecture," A Thesis Submitted in Partial Fulllment of the Requirements for the Degree of Doctor of Philosophy, Department of Computer Science & Engineering Indian Institute of Technology, Kanpur, Feb. 2004, 196 pages.

Suresh, "PERL—A Register-less Architecture," HI PC '98, 5th International Conference on High Performance Computing, Dec. 17-20, 1998, 8 pages.

(56) References Cited

OTHER PUBLICATIONS

Tanaka K., "Fast Context Switching by Hierarchical Task Allocation and Reconligurable Cache," In Proceedings of the 2003 International Workshop on Innovative Architecture for Future Generation High-Performance Processors and Systems (IWIA '03), Jul. 17, 2003, pp. 20-29.
Towner, Daniel William (BSc), "The 'Uniform Heterogeneous Multi-threaded' Processor Architecture", A dissertation submitted to the University of Bristol in accordance with the requirements for the degree of Doctor of Philosophy in the Faculty of Engineering, Department of Computer Science., Jun. 2002, p. 199.
Tremblay M., "The MAJC Architecture; A Systhesis of Parallelism and Scalability", Sun Microsystems, 901 San Antonio Rd., MS USUN03-202, Palo Alto, CA 94303, USA, Marc_tremblay@sun.com, Nov.-Dec. 2000, 25 pages.
Tullsen D.M., et al., "Exploiting Choice: Instruction Fetch and Issue on an Implementable Simultaneous Multithreading Processor," ACM/IEEE, Proceedings of the 23rd Annual Symposium on Computer Architecture, 1996, pp. 191-202.
Tullsen D.M., et al., "Simultaneous Multithreading: Maximizing On-Chip Parallelism," Proceedings of the 22nd Annual International Symposium on Computer Architecture, Jun. 1995, pp. 392-403.
Tullsen D.M., et al., "Supporting Fine-Grained Synchronization on a Simultaneous Multithreading Processor," In 5th International Symposium on High Performance Computer Architecture, Jan. 1999, 5 pages.
Tullsen., et al., "Supporting Fine-Grained Synchronization on a Simultaneous Multithreading Processor", UCSD CSE Technical Report CS98-587, Jun. 1998, 20 pages.
Yankelevsky, et al., "a-Coral: A Multigrain, Multithreading Processor Architecture", Conference Proceedings of the 15th International Conference on Supercomputing, ICS '01, ACM 2001 1-58113-410-x/01/06, 10 pages.
Notice of Grant from foreign counterpart Chinese Patent Application No. 200580010053.0, dated Jan. 17, 2012, 4 pages.
First Office Action from foreign counterpart Chinese Patent Application No. 201210105283.7, dated Apr. 30, 2014, 10 pages.
Third Office Action from foreign counterpart Chinese Patent Application No. 201210105283.7, dated Jun. 15, 2015, 11 pages.
Fourth Office Action from foreign counterpart Chinese Patent Application No. 201210105283.7, dated Dec. 25, 2015, 10 pages.
Notice of Grant from foreign counterpart Chinese Patent Application No. 201210105283.7, dated May 26, 2016, 4 pages.
Office Action from foreign counterpart Japanese Patent Application No. 2016-217176, dated Feb. 16, 2017, 7 pages.
Office Action from foreign counterpart Japanese Patent Application No. 2014-185017, dated Jul. 5, 2016, 6 pages.
Decision to Refuse from foreign counterpart Japanese Patent Application No. 2014-154360, dated Jul. 5, 2016, 5 pages.
Decision to Refuse from foreign counterpart Japanese Patent Application No. 2014-048903, dated Jul. 5, 2016, 6 pages.
Decision of Final Rejection from foreign counterpart Japanese Patent Application No. 2007-506565, dated Sep. 6, 2011, 4 pages.
Decision to Grant a Patent from foreign counterpart Japanese Patent Application No. 2007-506565, dated Feb. 7, 2012, 5 pages.
Non-Final Office Action from U.S. Appl. No. 15/943,609, dated Apr. 12, 2019, 33 pages.
Non-Final Office Action from U.S. Appl. No. 15/943,611, dated Apr. 26, 2019, 41 pages.
Advisory Action from U.S. Appl. No. 13/722,481, dated Feb. 6, 2014, 2 pages.
Alpert, Don, "Will Microprocessors Become Simpler?", Multi-threading May Reverse the Trend Toward Increasing Processor Complexity, Microprocessor Report, The Insider's Guide to Microprocessor Hardware, www.MPTonline.com, Nov. 17, 2003, pp. 1-4.
Bengoetxea E., "Inexact Graph Matching Using Estimation of Distribution Algorithms", PhD Thesis Abstract and Table of Contents, Ecole Nationale Superieure des Telecommunications, Dec. 19, 2002, 5 pages.
Bengoetxea E., "Appendix C: On Processes and threads: synchronization and communication in parallel programs," PhD Thesis, 2002, 16 pages.
Cray Research Inc., "The Cray X-MP Series of Computer Systems", 1985, 28 pages.
Cray Research Inc., "The Cray X-MP Series of Computers", 1983, 16 pages.
Decision of Final Rejection from foreign counterpart Japanese Patent Application No. 2012-001179, dated Nov. 19, 2013, 4 pages.
Decision of Final Rejection from foreign counterpart Japanese Patent Application No. 2012-095473, dated Apr. 1, 2014, 4 pages.
Decision to Refuse from foreign counterpart Japanese Patent Application No. 2016-217176, dated Jun. 12, 2018, 7 pages.
Final Office Action from U.S. Appl. No. 10/816,103, dated Dec. 29, 2010, 42 pages.
Final Office Action from U.S. Appl. No. 10/816,103, dated Jan. 29, 2010, 31 pages.
Final Office Action from U.S. Appl. No. 10/816,103, dated Mar. 5, 2007, 32 pages.
Final Office Action from U.S. Appl. No. 10/816,103, dated May 23, 2008, 35 pages.
Final Office Action from U.S. Appl. No. 10/816,103, dated Oct. 20, 2011, 39 pages.
Final Office Action from U.S. Appl. No. 10/816,103, dated Oct. 30, 2013, 43 pages.
Final Office Action from U.S. Appl. No. 13/722,481, dated Nov. 26, 2013, 30 pages.
Final Office Action from U.S. Appl. No. 13/722,481, dated Sep. 4, 2014, 16 pages.
Foldoc, "Atomic" definition, Apr. 3, 2000, downloaded from http://foldoc.org/atomic, 1 page.
foldoc.org. "Virtual Memory, Privileged Instruction, Supervisor Mode, Process, Multithreading, and Context Switch", 1995-2002.
Galvin, Peter, and Silbeschatz, Abraham, "Operating System Concepts", Addison-Wesley Publishing Company, Fourth Edition, 1995. pp. 106-116.
Hankins et al., "Multiple Instruction Stream Processor", Proceedings of the 33rd International Symposium on Computer Architecture (ISCA'06), 2006, pp. 2-17/E.
Hennessy, John. Patterson, David. "Computer Architecture a Quantitative Approach". Morgan Kaufmann Publishers Inc. Second Edition, 1996. pp. 39-41.
Intel Corp., "Intel® Hyper-Threading Technology," Technical User's Guide, Jan. 2003, 44 pages.
International Preliminary Report on Patentability and Written Opinion received for PCT Application No. PCT/2005/010923, dated 12, 2006, 7 pages.
International Search Report and Written Opinion received for PCT Application No. PCT/2005/010923, dated May 3, 2005, 12 pages.
Kawahara et al., "A Study on an Implementation of a Simultaneous Multithreaded Architecture", IPSJ Journal, Information Processing Society of Japan (IPSJ), vol. 43 (4), Apr. 2002, pp. 829-843.
Keckler S.W., et al., "Exploiting Fine Grain Thread Level Parallelism on the MIT Multi-ALU processor," IEEE, Jun. 1998, 12 pages.
Kissel, Kevin D., "Multithreading Extensions to the MIPS(R) Architecture", MIPS Technologies, At the core of the user experience, TM Copyright (c) 2003 MIPS Technologies, Inc. All rights reserved pp. 1-23.
Levy, Markus, "Multithread Technologies Disclosed At MPF", Imagination and MIPS Discuss Details of New Architectures, Microprocessor Report, The Insider's Guide to Microprocessor Hardware, www.MPR online.com, Nov. 10, 2003, pp. 1-4.
Marshall, Dave. "Threads: Basic Theory and Libraries." Jan. 5, 1999, 23 Pages. Obtained via http://www.cs.cf.ac.uk/Dave/C/node29.html.
Mclellane., "The Alpha AXP Architecture and 21064 Processor," IEEE Micro, 1993, 12 pages.
Non-Final Office Action from U.S. Appl. No. 10/816,103, dated Aug. 15, 2007, 32 pages.
Non-Final Office Action from U.S. Appl. No. 10/816,103, dated Jul. 14, 2010, 35 pages.
Non-Final Office Action from U.S. Appl. No. 10/816,103, dated Jun. 1, 2009, 31 pages.

(56) References Cited

OTHER PUBLICATIONS

Non-Final Office Action from U.S. Appl. No. 10/816,103, dated Jun. 8, 2006, 31 pages.
Non-Final Office Action from U.S. Appl. No. 10/816,103, dated Jun. 28, 2013, 51 pages.
Non-Final Office Action from U.S. Appl. No. 10/816,103, dated May 19, 2011, 41 pages.
Non-Final Office Action from U.S. Appl. No. 13/722,481, dated Apr. 28, 2014, 27 pages.
Non-Final Office Action from U.S. Appl. No. 13/722,481, dated May 10, 2013, 18 pages.
Non-Final Office Action from U.S. Appl. No. 15/088,043, dated Jun. 28, 2017, 21 pages.
Notice of Allowance from U.S. Appl. No. 15/088,043, dated Dec. 12, 2017, 7 pages.
Notice of Allowance from U.S. Appl. No. 10/816,103, dated Dec. 3, 2014, 15 pages.
Notice of Allowance from U.S. Appl. No. 10/816,103, dated May 12, 2015, 9 pages.
Notice of Allowance from U.S. Appl. No. 13/722,481, dated Nov. 19, 2014, 7 pages.
Notice of Allowance from U.S. Appl. No. 13/722,481, dated May 16, 2016, 22 pages.
Notification of Reasons for Refusal from foreign counterpart Japanese Patent Application No. 2012-001179, dated Jun. 25, 2013, 6 pages.
Gontmakher, et al., "Intrathreads: Techniques for Parallelizing Sequential Code," 6th Workshop on Multi-threaded Execution, Architecture and Compilation, MTEAC-6, Nov. 19, 2002, pp. 1-9.
Intel, IA-32 Intel Architecture Software Developer's Manual, vol. 1: Basic Architecture, "Chapter 2: Introduction to the IA 32 Intel Architecture," Order No. 245470-012, 2003, pp. 1-13 (no publication month available).
Notice of Allowance from U.S. Appl. No. 15/943,609, dated Aug. 30, 2019, 25 pages.
Notice of Allowance from U.S. Appl. No. 15/943,611, dated Sep. 3, 2019, 28 pages.
Notice of Allowance from U.S. Appl. No. 15/943,614, dated Sep. 11, 2019, 30 pages.
Notice of Reasons for Rejection from foreign counterpart Japanese Patent Application No. 2018-187423, dated Jul. 30, 2019, 7 pages.
Signorelli, et al., "MAJC: Innovation in Parallelism," 2001, pp. 1-6 (no publication month available).
Sohi, et al., "Speculative Multithreaded Processors," IEEE Computer 2001, Cover Feature, Apr. 2001, pp. 66-73.
Sudharsanan, S., "MAJC-5200: A High Performance Microprocessor for Multimedia Computing," Sun Microsystems, Inc., May 2000, 8 pages.
Sun Microsystems, "MAJC Architecture Tutorial," White Paper, Sep. 1999, retrieved from http://www.sun.com/microelectronics/MAJC/documentation/docs/majctutorial.pdf, pp. 1-31.
Sun Microsystems, Sun MAJC 5200, "A Processor for the 21st Century ", 35 pages.
Takase, H., "Implementations of Exclusively Operating Heterogeneous Multicore Processor and its Real-time Operating System," IPSJ SIG Technical Report, Information Processing Society of Japan, Mar. 8, 2014, pp. 85-90 (9 pages).

* cited by examiner

METHOD AND SYSTEM TO PROVIDE USER-LEVEL MULTITHREADING

CROSS REFERENCE TO RELATED APPLICATIONS

This application is a continuation co-pending U.S. application Ser. No. 15/088,043, filed on Mar. 31, 2016, which is a continuation of application U.S. application Ser. No. 13/722,481, filed on Dec. 20, 2012, now U.S. Issued U.S. Pat. No. 9,442,721, Issued on Sep. 13, 2016, which is a continuation of U.S. application Ser. No. 10/816,103, filed Mar. 31, 2004, now U.S. Issued U.S. Pat. No. 9,189,230, Issued on Nov. 17, 2015, all of which is hereby incorporated by reference.

FIELD

The present embodiments of the invention relate to the field of computer systems. In particular, the present embodiments relate to a method and system to provide user-level multithreading.

BACKGROUND

Multithreading is the ability of a program or an operating system to execute more than one sequence of instructions at a time. Each user request for a program or system service (and here a user can also be another program) is kept track of as a thread with a separate identity. As programs work on behalf of the initial request for that thread and are interrupted by other requests, the status of work on behalf of that thread is kept track of until the work is completed.

Types of computer processing include single instruction stream, single data stream, which is the conventional serial von Neumann computer that includes a single stream of instructions. A second processing type is the single instruction stream, multiple data streams process (SIMD). This processing scheme may include multiple arithmetic-logic processors and a single control processor. Each of the arithmetic-logic processors performs operations on the data in lock step and are synchronized by the control processor. A third type is multiple instruction streams, single data stream (MISD) processing which involves processing the same data stream flows through a linear array of processors executing different instruction streams. A fourth processing type is multiple instruction streams, multiple data streams (MIMD) processing which uses multiple processors, each executing its own instruction stream to process a data stream fed to each of the processors. MIMD processors may have several instruction processing units, multiple instruction sequencers and therefore several data streams.

The programming model adopted by today's multi-threaded microprocessors is the same as the traditional shared memory multiprocessor: multiple threads are programmed as though they run on independent CPUs. Communication between threads is performed through main memory, and thread creation/destruction/scheduling is performed by the operating system. Multithreading has not been provided in an architecturally-visible manner in which programmers can directly access threads.

BRIEF DESCRIPTION OF THE DRAWINGS

The present embodiments of the invention will be understood and appreciated more fully from the following detailed description taken in conjunction with the drawings in which.

DETAILED DESCRIPTION

Figure 1:
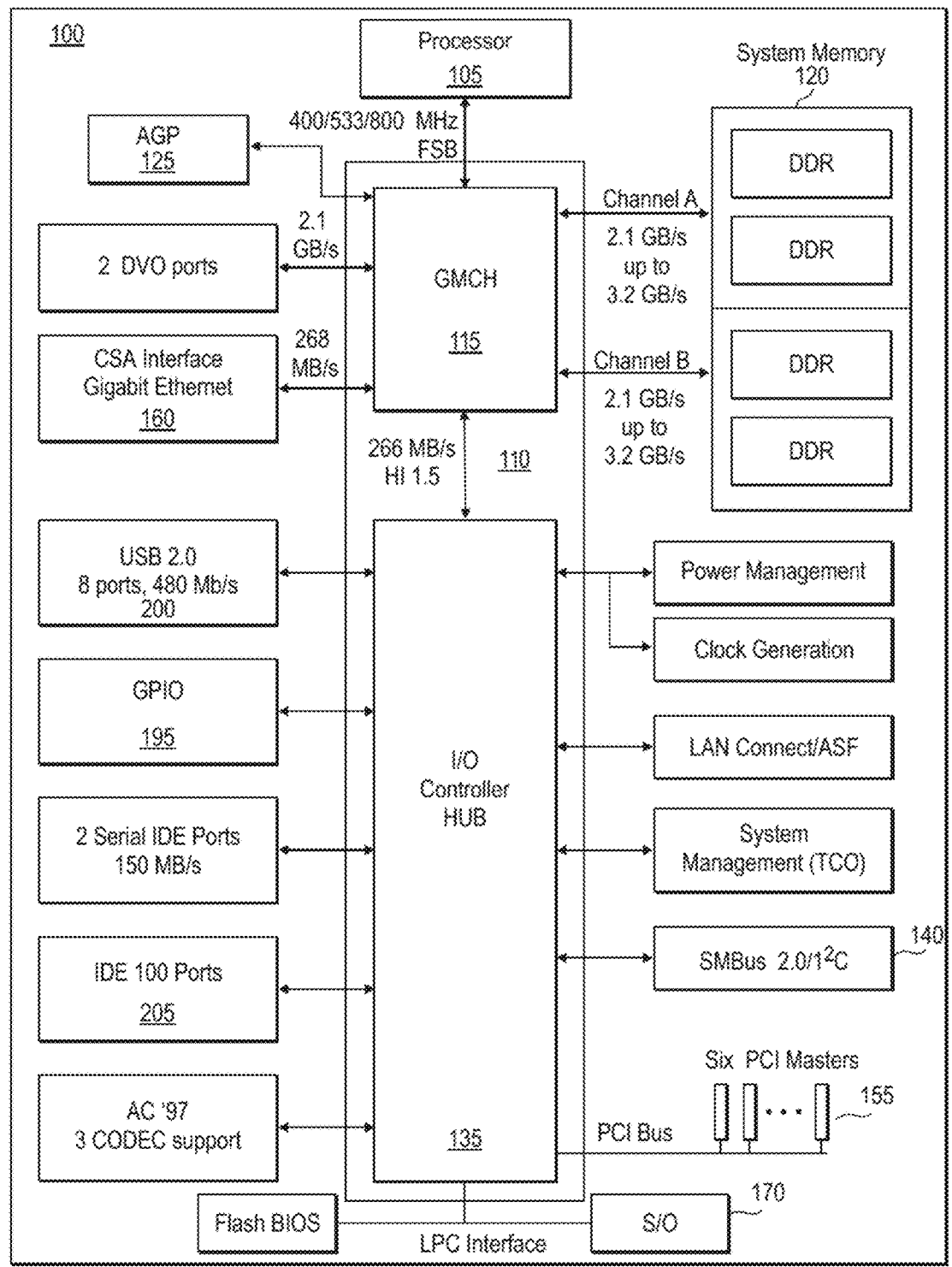
FIG. 1 illustrates a block diagram of an exemplary computer system utilizing the present method and apparatus, according to one embodiment of the present invention.

A method and system to provide user-level multithreading are disclosed. The method according to the present techniques comprises receiving programming instructions to execute one or more shared resource threads (shreds) via an instruction set architecture (ISA). One or more instruction pointers are configured via the ISA; and the one or more shreds are executed simultaneously with a microprocessor, wherein the microprocessor includes multiple instruction sequencers.

In the following description, for purposes of explanation, specific nomenclature is set forth. However, it will be apparent to one skilled in the art that these specific details are not required. Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The embodiments of the invention provided also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the required method. The required structure for a variety of these systems will appear from the description below. In addition, one embodiment of the present invention is not described with reference to any particular programming language. It will be appreciated that a variety of programming languages may be used to implement the teachings of embodiments of the invention as described herein.

"Users" as used throughout this specification, describe user-level software such as application programs, non-privileged code, and similar software. User-level software is distinguished from an operating system or similar privileged software. According to one embodiment of the present invention, the following description applies to MIMD processors, as described above.

FIG. 1 illustrates a block diagram of an exemplary computer system 100 utilizing the present method and apparatus, according to one embodiment of the present invention. Computer system includes a processor 105. Chipset 110 provides system 100 with memory and I/O functions. More particularly, chipset 110 includes a Graphics and Memory Controller Hub (GMCH) 115. GMCH 115 acts as a host controller that communicates with processor 105 and further acts as a controller for main memory 120. Processor 105 allows the extension of multithreading to a user-level, according to one embodiment of the present invention. GMCH 115 also provides an interface to Advanced Graphics Port (AGP) controller 125 which is coupled thereto. Chipset 110 further includes an I/O Controller Hub (ICH) 135 which performs numerous I/O functions. ICH 135 is coupled to a System Management Bus (SM Bus) 140.

ICH 135 is coupled to a Peripheral Component Interconnect (PCI) bus 155. A super I/O ("SID") controller 170 is coupled to ICH 135 to provide connectivity to input devices such as a keyboard and mouse 175. A general-purpose I/O (GPIO) bus 195 is coupled to ICH 135. USB ports 200 are coupled to ICH 135 as shown. USB devices such as printers, scanners, joysticks, etc. can be added to the system configuration on this bus. An integrated drive electronics (IDE) bus 205 is coupled to ICH 135 to connect IDE drives 210 to the computer system. Logically, ICH 135 appears as multiple PCI devices within a single physical component.

Included in processor 105, is an instruction set architecture. Instruction set architecture (ISA) is an abstract model of a microprocessor, such as processor 105, that consists of state elements (registers) and instructions that operate on those state elements. The instruction set architecture serves as a boundary between software and hardware by providing an abstract specification of the microprocessor's behavior to both the programmer and the microprocessor designer.

Advances in the number of transistors available on a silicon chip have enabled the introduction of multithreading into general-purpose microprocessors. Multithreading may be implemented in two different manners: chip-level multiprocessor (CMP) and simultaneous multithreaded processor (SMT), both of which may be used as processor 105.

Figure 2:
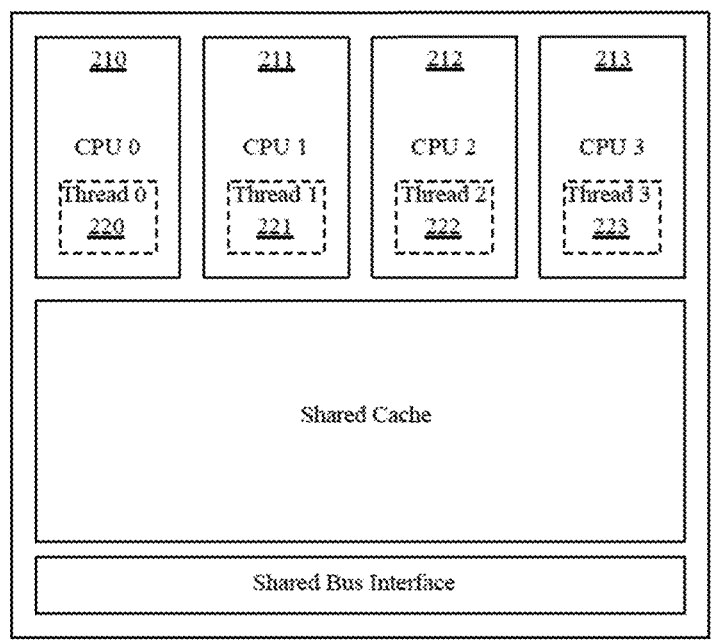
FIG. 2 illustrates an exemplary chip-level multiprocessor, according to one embodiment of the present invention.

FIG. 2 illustrates an exemplary chip-level multiprocessor, according to one embodiment of the present invention. In a chip-level multiprocessor, such as processor 200, multiple CPU cores 210-213 are integrated onto a single silicon chip 200. Each of CPU cores 210-213 is capable of carrying out an independent thread 220-223 of execution even though some resources (such as caches) may be shared by more than one of CPU cores 210-213.

Figure 3:
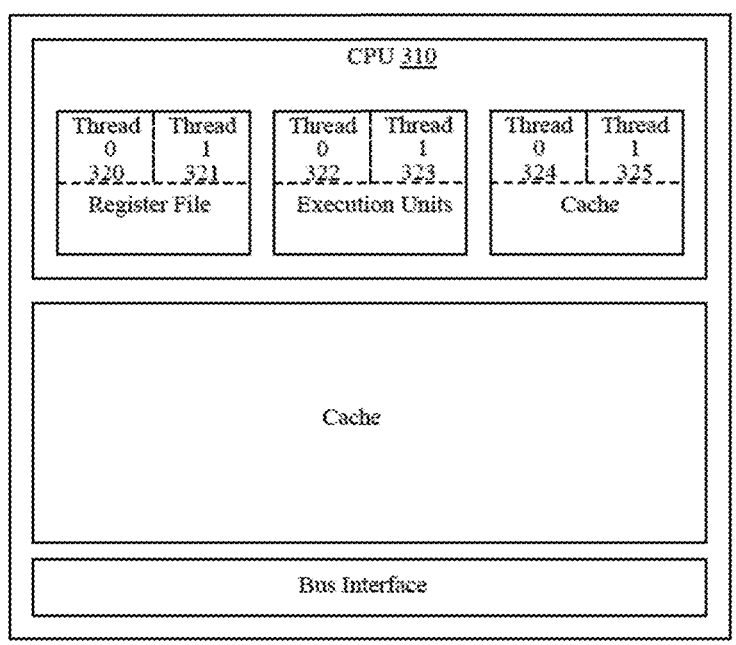
FIG. 3 illustrates an exemplary simultaneous multi-threaded processor, according to one embodiment of the present invention.

FIG. 3 illustrates an exemplary simultaneous multithreaded processor 300, according to one embodiment of the present invention. Processor 105 can be a simultaneous multithreaded processor, such as processor 300. In a simultaneous multithreaded processor 300, a single CPU core 310 is capable of carrying out multiple threads of execution. The CPU core 310 appears to software as two or more processors by sharing CPU resources with extremely fine granularity (often determining which thread to process with each resource on a clock-by-clock basis).

Figure 4:
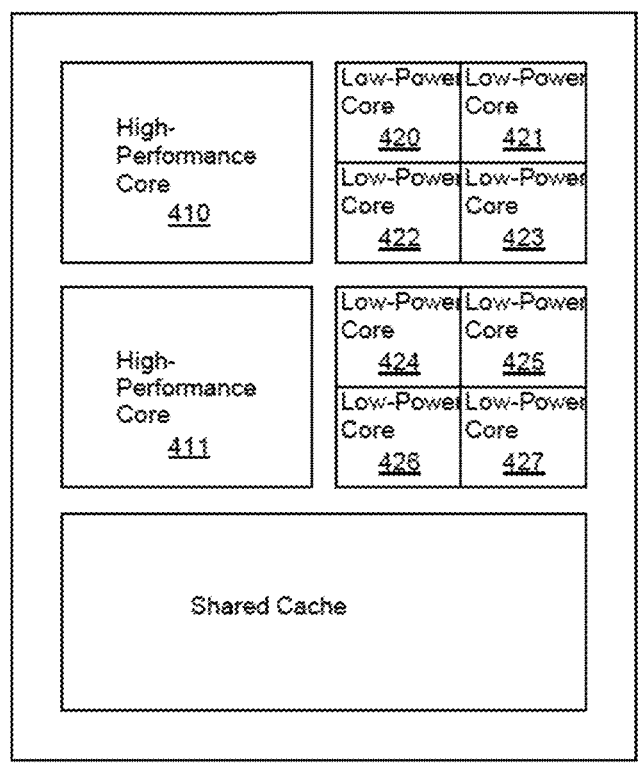
FIG. 4 illustrates an exemplary asymmetric multiprocessor, according to one embodiment of the present invention.

FIG. 4 illustrates an exemplary asymmetric multiprocessor 400, according to one embodiment of the present invention. Processor 105 can be an asymmetric multiprocessor, such as multiprocessor 400. It is possible to build a chip-level multiprocessor 400 in which the CPU cores 410-427 have different microarchitectures but the same ISA. For example, a small number of high performance CPU cores 410-411 may be integrated with a large number of low-power CPU cores 420-427. This type of design can achieve high aggregate throughput as well as high scalar performance. The two types of CPU cores can appear to software either as conventional shared-memory threads, or as the shreds, or some combination of both. Instruction set architecture (ISA) is an abstract model of a microprocessor, such as processor 105, that consists of state elements (registers) and instructions that operate on those state elements. The ISA serves as a boundary between software and hardware by providing an abstract specification of the microprocessor's behavior to both the programmer and the microprocessor designer. The present programming model enables the application program to directly control multiple asymmetrical CPU cores.

Shared-Memory Programming Model

Prior multithreaded microprocessors adopt the same programming model as prior shared-memory multiprocessor systems. The programming model is as follows. A microprocessor provides multiple threads of execution to the operating system. The operating system uses these threads to run multiple applications ("processes") concurrently, and/or run multiple threads from a single application ("multi-threaded") concurrently. In both cases, the threads appear to software as independent CPUs. Main memory is shared by all threads and communication between threads is carried out through main memory. Hardware resources within the CPU may also be shared, but the sharing is hidden from software by the microarchitecture.

While the traditional shared memory multiprocessor programming model is widely understood and supported by many operating systems and application programs, the model has a number of disadvantages. They are:

1) Communication between threads is carried out via main memory and is thus extremely slow. Caching can alleviate some of the latency, but often cache lines must be passed from one CPU core to another to facilitate sharing.
2) Synchronization between threads is carried out using memory-based semaphores, and is thus extremely slow.
3) Creating, destroying, suspending, and resuming threads requires intervention of the operating system and is thus extremely slow.
4) A microprocessor vendor is not able to offer the most effective multithreading because improvements in CPU multithreading are being diluted by the memory latencies and operating system latencies described above.

Multithreading Architecture Extension

For the reasons stated above regarding prior systems, the present method and system extend processor architectures to include architecturally-visible multithreading through multithreading architecture extensions. Multiple simultaneous threads of execution, multiple instruction pointers, and multiple copies of certain application state (registers) within a single processing element are provided. Multiple threads of execution are distinguishable from existing shared-memory threads, and are referred to as shreds, or shared resource threads.

The present multithreading architecture extensions (an example of which is hereafter referred to as "MAX") would include existing architecture capabilities and in addition support multiple simultaneous shreds, each with its own instruction pointer, general registers, FP registers, branch registers, predicate registers, and certain application registers. Non-privileged instructions are created to create and destroy shreds. Communication between shreds are carried out through shared registers in addition to shared memory. The need for semaphores would be reduced because the present multithreading architecture extensions would guarantee atomic access to shared registers. Additionally, the present multithreading architecture extensions can be used with 32-bit architectures, such as the 32-bit architecture by Intel®, or 64-bit architectures, such as 64-bit architecture also by Intel®, or even 16-bit architectures.

A comparison between the conventional shared-memory multiprocessor thread and a shred is shown in the following table, according to one embodiment of the present invention.

TABLE 1

| Operation | Shared Memory Multiprocessor Thread | Multithreading Architecture Extension shred |
|---|---|---|
| Creation, Destruction | Operating system call | Non-privileged instruction |
| Communication | Shared memory | Shared registers and memory |
| Synchronization | Memory semaphore | Register and memory semaphores. Shared registers guarantee atomic update. |
| System state | Unique system state for each thread | Shared system state for all shreds |

It should be noted that the present multithreading architecture extension is fundamentally different from prior architecture extensions. While prior architecture extensions provided more instructions and more registers (state), the multithreading architecture extension provides more units of execution.

Application and System State

Programmer-visible CPU state may be divided into two categories: application state and system state. The application state is used and controlled by both application programs and the operating system, while the system state is controlled exclusively by the operating system.

Figure 5:
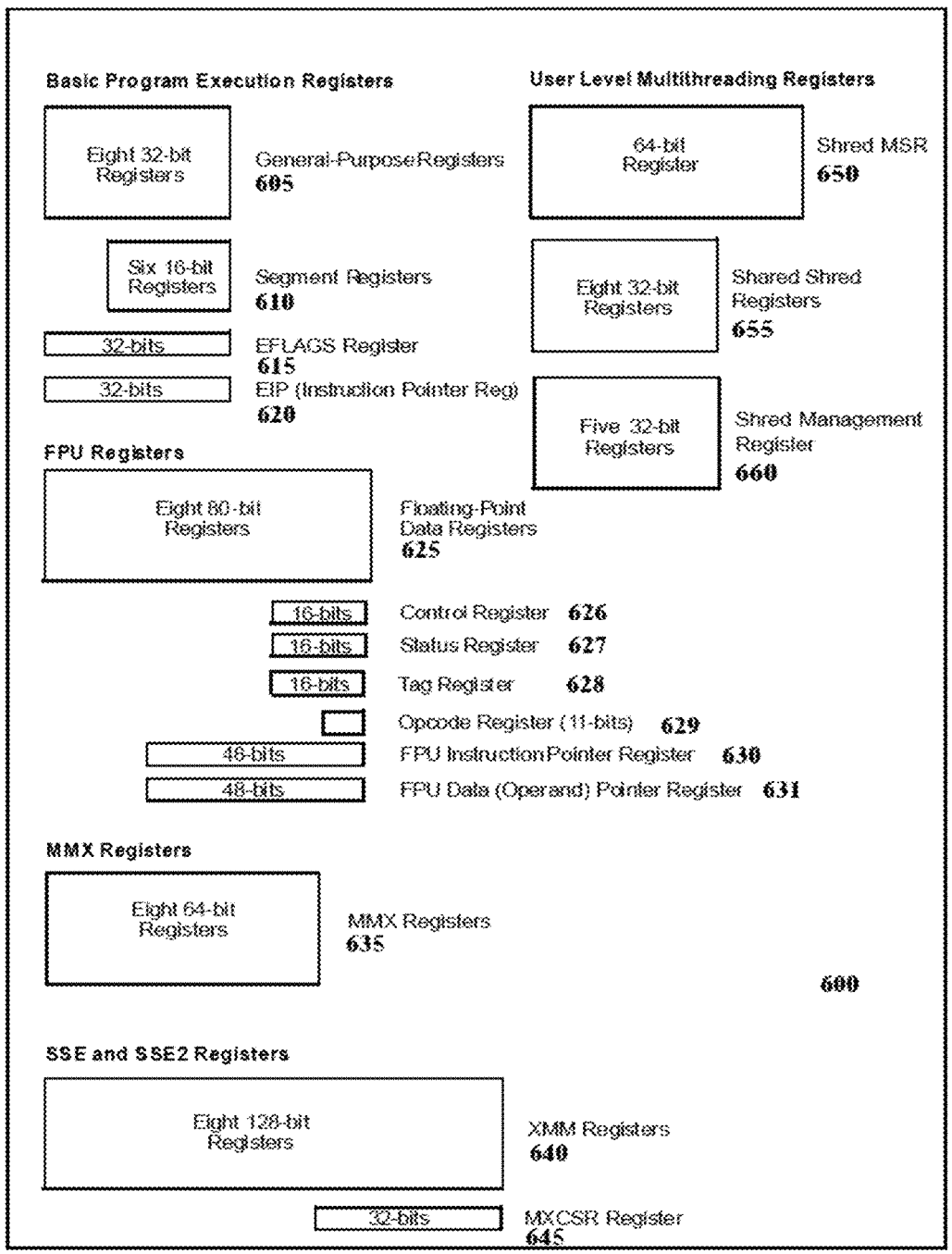
FIG. 5 illustrates an exemplary execution environment for providing user-level multithreading, according to one embodiment of the present invention.

FIG. 5 illustrates an exemplary execution environment for providing user-level multithreading, according to one embodiment of the present invention. The execution environment 600 includes the registers whose application state is summarized in the following table:

TABLE 2

| 32-bit architecture Application State | Name | Width |
|---|---|---|
| General Purpose Registers 605 | EAX, EBX, ECX, EDX, EBP, ESI, EDI, ESP | 32-bits |
| Floating Point Registers 625 | ST0-7 | 80-bits |
| Segment Registers 610 | CS, DS, ES, FS, GS, SS | 16-bits |
| Flags Register 615 | EFLAGS | 32-bits, certain bits are application |
| Instruction Pointer 620 | EIP | 32-bits |
| FP Control and Status Registers 626-631 | CW 626, SW 627, TW 628, FP opcode 629, instruction pointer 630, operand pointer 631 | 16-bits, 16-bits, 16-bits, 11-bits, 48-bits, 48-bits |
| MMX Registers 635 | MM0-7 | 64-bits, aliased to ST0-7 |
| SSE Registers 640 | XMM0-7 | 128-bits |
| MXCSR Register 645 | MXCSR | 32-bits |

User-level multithreading registers 650-665 will be described in greater detail below.

The 32-bit architecture system state is summarized below.

TABLE 3

| 32-bit architecture System State | Number | Width |
|---|---|---|
| Control Registers 626 | CR0-CR4 | 32-bits |
| Flags Register 615 | Subset EFLAGS | 32-bits, subset |
| Memory Management Registers | GDTR, IDTR | 48-bits |
| Local Descriptor Table Register, Task Register | LDTR, TR | 16-bits |
| Debug Registers | DR0-DR7 | 32-bits |
| Model Specific Registers 650 | MSR0-MSRN | 64-bits Includes registers for time stamp counter, APIC, machine check, memory type range registers, performance monitoring. |
| Shared registers 655 | SH0-SH7 | 32-bits |
| Shred control registers 660 | SC0-SC4 | 32-bits |

For each shred, the application state is divided into two categories: per-shred application state and shared application state. The MAX programming model described herein, provides a unique instance of the per-shred application state while the shared application state is shared among multiple shreds. There is only one copy of the system state and all shreds corresponding to a given thread share the same system state. An approximate division of application and state is presented in the following table:

TABLE 4

| State | Type |
| --- | --- |
| General Registers (programmable subset)<br>Floating Point Registers (programmable subset)<br>SSE Registers (programmable subset)<br>Instruction Pointer<br>Flags (application subset) | Per-shred private state |
| General Registers (programmable subset)<br>Floating Point Registers (programmable subset)<br>SSE Registers (programmable subset)<br>Shared Registers (new)<br>Flags (system subset)<br>Memory Management Registers<br>Address Translation (TLBs)<br>Current Privilege Level<br>Control Registers | Shared among multiple shreds, private to each thread |
| Main Memory | Shared among multiple threads |

The present multithreading architecture extension offers programmable sharing or privacy of most application state so that software can select the best partitioning. The programming is performed with a bit-vector so that individual registers can be selected as either shared or private. A hardware re-namer can allocate registers from either a shared pool or a private pool as specified by the bit-vector.

The overall storage requirements of MAX are smaller than those of prior simultaneous multithreaded processors and chip-level multiprocessors. In MAX, only the per-shred private application state is replicated, whereas in a simultaneously multithreaded processor or chip-level multiprocessor that implements the traditional shared-memory multiprocessor programming model, the entire application and system state must be replicated.

Shred/Thread Hierarchy

Each shared memory thread consists of multiple shreds. The shreds and shared-memory threads form a two-level hierarchy. In an alternate embodiment, a three-level hierarchy can be built from clusters of shared-memory MAX processors. The clusters communicate using message passing. The operating system handles the scheduling of threads whereas the application program handles the scheduling of shreds. The shreds are non-uniform in the sense that any given shred sees other shreds as either local or remote. Per-shred application state is replicated for each shred. The shared application and system state is common to the local shreds, and replicated for each shared-memory thread. The memory state has only one copy.

Figure 6:
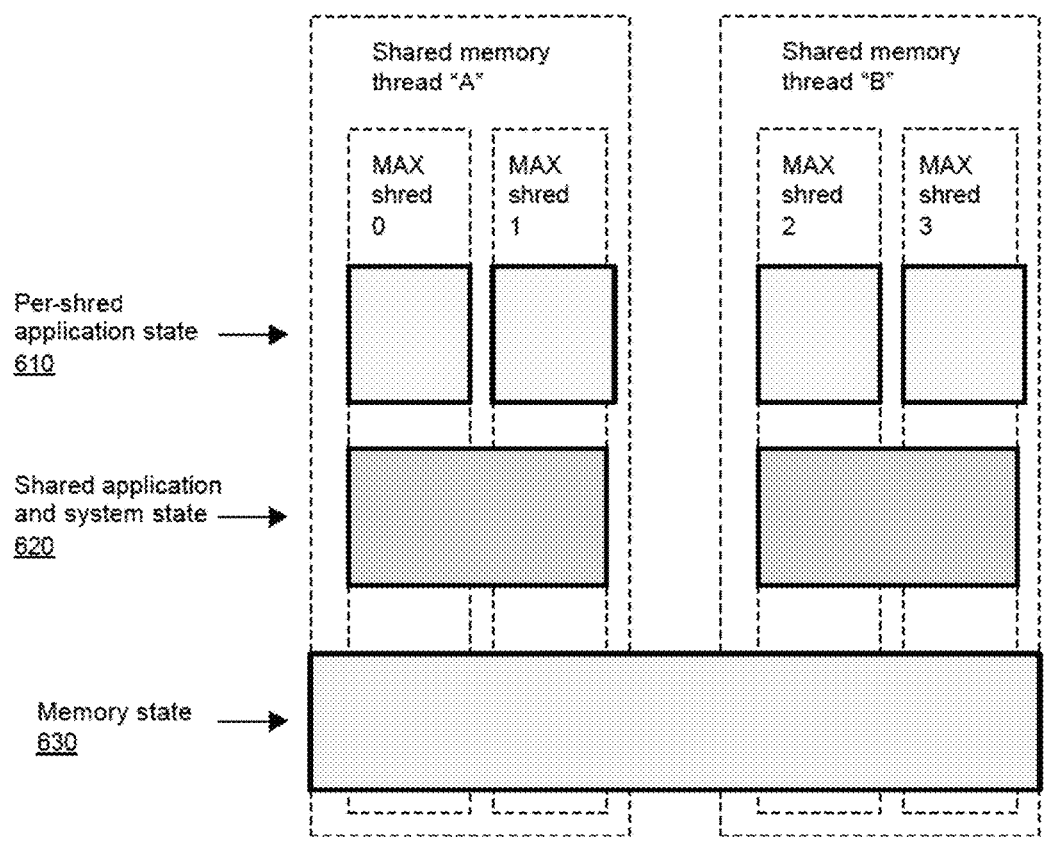
FIG. 6 illustrates an exemplary relationship between shreds and shared memory threads, according to one embodiment of the present invention.

FIG. 6 illustrates an exemplary relationship between shreds and shared memory threads, according to one embodiment of the present invention. Per-shred application state 510 is replicated for each shred. The shared application and system state 520 is common to the local shreds, and replicated for each shared-memory thread. The memory state 530 has only one copy.

Because the system state 520 is shared between multiple shreds in the MAX programming model, the multiple shreds belong to the same process. The present multithreading architecture extensions are intended to be used by multithreaded applications, libraries, and virtual machines. The MAX programming model gives this type of software an unprecedented degree of control over its shreds and a performance potential that is not achievable with the shared-memory multiprocessor programming model discussed above.

No protection checking is required between shreds since they all run at the same privilege level and share the same address translation. Thus, the traditional protection mechanisms may be avoided during inter-shred communication.

The MAX programming model cannot be used to run different processes on the same thread due to the shared system state. For this reason, the MAX and prior shared-memory programming models coexist within the same system.

Since a given CPU offers a finite number of physical shreds, software virtualizes the number of available shreds in a similar manner to the virtualization of hardware threads. The virtualization results in a finite number of currently running physical shreds along with a potentially unbounded number of virtual shreds.

System Calls

Operating system calls may be processed in the conventional manner by transferring control from the application program to the operating system and performing a context switch. With the MAX architecture, one key difference is that calling the operating system on any shred will suspend the execution of all shreds associated with a given thread. The operating system is responsible for saving and restoring the state of all shreds belonging to the same thread.

Due to the additional state, the context switch overhead increases. The context switch memory footprint grows in proportion to the number of shreds. However, the context switch time does not increase by much because each shred can save/restore its state in parallel with other shreds. The context switch mechanism allows parallel state save/restore using multiple sequencers. The operating system itself makes use of multiple shreds.

Because the cost of calling the operating system increases, certain functionality that was performed by the operating system to be migrated to the application program. This functionality includes thread maintenance and processing of certain exceptions and interrupts.

An alternative embodiment of performing system calls is based on the observation that threads are becoming cheap while context switches are becoming expensive. In this embodiment, a thread is dedicated to running the operating system and a second thread is dedicated to running the application program. When the application program shred performs a system call, it sends a message to an operating system shred (via shared memory) and waits for a response message. In this manner, the message passing and wait mechanism replaces the conventional control transfer and context switch mechanism. No change to the address translation of either thread is required. The benefit is that a message sent by one shred to the operating system does not disturb other local shreds.

Exceptions

In prior architectures, exceptions suspend execution of the application program and invoke an operating system exception handler. Under the MAX programming model, this behavior is undesirable because suspending one shred to invoke the operating system causes all shreds (associated with a given thread) also to be suspended.

To solve this problem, we introduce a new user-level exception mechanism that gives the application program the first opportunity to service many types of exceptions. The user-level exception mechanism is based on the observation that a few existing exception types are ultimately serviced by the application itself.

For the user-level exception mechanism, how an exception is reported versus is distinguished from how an exception is serviced. Exceptions may be divided into three categories as follows.

1. Exceptions that are reported to the application program and serviced by the application program. For example, a divide by zero exception is reported to the application that caused the exception, and also serviced by the application. No operating system involvement is necessary or desirable.
2. Exceptions that are reported to the application program, which must then call the operating system for service. A page fault raised by an application may be reported to the application, but the application program must call the operating system to swap in the page.
3. Exceptions that must be reported to the operating system and serviced by the operating system. For security reasons, hardware interrupts must be reported to the operating system. System calls (software interrupts) must obviously be reported to the operating system The following table illustrates the exceptions in each of the three categories. The "Load exception on cache miss" and "Fine-grained timer" exception types are provided as exception types related to one embodiment of the present invention.

TABLE 5

| Exception Type | Reported to | Serviced by |
| --- | --- | --- |
| Divide by zero, overflow, bound, FP exception | Application | Application |
| Alignment check | Application | Application |
| Invalid opcode | Application | Application |
| Load exception on cache miss | Application | Application |
| Fine-grained timer | Application | Application |
| Stack segment fault | Application | System |
| General protection | Application | System |
| Page fault | Application | System |
| Double fault | Application | System |
| Device not available | Application | System |
| Hardware interrupt | System | System |
| Non-maskable interrupt | System | System |
| Software interrupt (INT n) | System | System |

Exceptions reported to the application program are selectively processed within the application, or passed to the operating system for processing. In the latter case, the application program performs a system call to explicitly request service from the operating system in response to an exception (such as a page fault). This contrasts with the traditional approach of the operating system implicitly performing such services on behalf of the application. To avoid nested exceptions, special provisions are provided to ensure that the application code that relays exceptions to the operating system does not itself incur additional exceptions. The user-level exception mechanism saves a minimum number of CPU registers in a shadow register set, and the processor vectors to a fixed location.

Virtual Machines

Virtual machines and the present embodiments of multi-threading architecture extensions impose constraints on each other because virtual machines raise exceptions whenever software attempts to access a resource that is being virtualized, and exception processing has significant performance consequences to the shreds.

In a virtual machine, the execution of privileged instructions or access to privileged processor state raises an exception. The exception must be reported to (and serviced by) the virtual machine monitor. In MAX, exceptions serviced by the operating system (and virtual machine monitor) cause all shreds associated with a given thread to be suspended. The virtual machine monitor comprehends the presence of multiple shreds. The virtual machine architecture minimizes the number of exceptions raised on non-privileged instructions and processor resources.

Deadlock

Deadlock avoidance is complicated in the MAX architecture because shreds can be suspended by other local shreds. The application software ensures that deadlock will not occur if one shred incurs an OS-serviced exception or system call, causing all local shreds to be suspended.

Local (inter-shred) communication and synchronization, is distinguished from remote (inter-thread) communication and synchronization. Local communication is performed using either shared registers 655 (illustrated in FIG. 5) or shared memory. Remote communication is performed using shared memory. Local data synchronization is performed using atomic register updates, register semaphores, or memory semaphores. Remote data synchronization is performed using memory semaphores.

Both local and remote shred control (creation, destruction) are performed using the MAX instructions. Shred control does not call the operating system for wait ( ) or yield ( ) because this can have the unintentional effect of suspending all shreds on a given thread. The operating system calls used for thread maintenance are replaced by calls to a user-level shred library. The shred library, in turn, calls the operating system to create and destroy threads as needed.

Shreds and Fibers

Shreds differ from fibers implemented in prior operating systems. The differences are summarized in the table below:

TABLE 6

| Characteristic | Fiber | Shred |
| --- | --- | --- |
| Creation | A thread may create multiple fibers | A thread may create multiple shreds |
| Concurrency | A thread can run one fiber at any instant in time | A thread can run multiple shreds simultaneously |
| Scheduling | Fibers are scheduled by software using a cooperative multitasking mechanism | shreds are scheduled by hardware using simultaneous multithreading or chip-level multiprocessing |
| State | Each fiber has its own private application state | Each shred has its own private application state |
| State storage | The currently-running fiber's state is stored in registers. Inactive fiber's state is stored in memory. | Each currently-running physical shred's state is stored in on-chip registers. Inactive virtual shred's state is stored in memory. |
| State management | The operating system saves/restores the currently-running fiber's state on a context switch | The operating system saves/restores all shred's application state on a context switch |

Hardware Implementation

The implementation of a microprocessor supporting the multithreading architecture extensions can take the form of chip-level multiprocessors (CMP) and simultaneous multithreaded processors (SMT). The prior CMP and SMT processors try to hide the sharing of CPU resources from software, whereas when implemented with the present embodiments of multithreading architecture extensions, a processor exposes sharing as part of the architecture.

To implement a MAX processor as a chip-level multiprocessor, a broadcast mechanism is used to keep multiple copies of the system state in synchronization between the CPU cores. Fast communication busses are introduced for shared application and system state. Because on-chip communication is fast relative to off-chip memory, these communication busses give the MAX processor its performance advantage over a shared-memory multiprocessor.

Implementing a MAX processor as a simultaneous multithreaded processor is possible since the hardware already provides the necessary sharing of resources. It is possible to implement MAX almost entirely in microcode on a multithreaded 32-bit processor.

According to one embodiment, the present method and system permits the prioritization of system calls and exceptions (reported to the OS) among multiple shreds such that only one shred's request is serviced at any instant in time. Prioritization and selection of one request is necessary because the system state is capable of handing only one OS service request at a time. For example, assume that shred 1 and shred 2 simultaneously perform system calls. The prioritizer would ensure that only shred 1's system call was executed and shred 2's system call had not yet begun execution. For fairness considerations, the prioritizer employs a round-robin selection algorithm, although other selection algorithms may be used.

Scalability

Scalability of the MAX programming model is determined by:

1) The amount of state that is feasible to save/restore on a context switch
2) The reduction in parallelism that results from suspending all shreds associated with a given thread during a context switch
3) Inter-shred communication As the number of shreds increases, the amount of state that must be saved/restored on a context switch increases, and the potential parallelism that is lost as a result of suspending all shreds increases. These two factors will limit the practical number of shreds.

Inter-shred communication will also limit scalability since this communication is performed using on-chip resources. In contrast, the scalability of the traditional shared-memory multiprocessor model is limited by off-chip communication.

Shared Taxonomy

A taxonomy of the various degrees of freedom in architecture, implementation, and software usage of shreds is presented in the following table:

TABLE 7

| Attribute | Option 1 | Option 2 | Option 3 |
|---|---|---|---|
| Instruction set architecture | Homogeneous - all shreds implement the same instruction set architecture | Heterogeneous - shreds implement different instruction set architectures | |
| Microarchitectural implementation | Symmetric - all shreds run on the same hardware microarchitecture | Asymmetric - sheds run on different hardware microarchitectures | |
| Application Parallelism | Sequential - conventional sequential code | Parallel - parallelized code | |
| shred generation | Programmer generated - shreds are explicitly created by the programmer | Compiled - shreds are automatically created by the compiler | Fixed function - shreds are dedicated to specific functions such as garbage collection |
| Architectural correctness | Architectural - all shreds contribute to the architectural correctness of the program | Hint - some shreds contribute to architectural correctness whereas other shreds contribute only to performance | |
| Input/output | Computation. Shreds perform only computation. | I/O. Shreds perform input/output in addition to computation. | |

Two different types of MAX architecture are distinguished: homogeneous and heterogeneous. Homogeneous shreds are similar to homogeneous multiprocessors in that all shreds execute the same instruction set. Heterogeneous shreds are also possible in a similar manner as heterogeneous multiprocessors. For example, heterogeneous shreds may be constructed between:

A 32-bit processor and a network processor.

A 32-bit processor and a 64-bit processor.

Similarly, the underlying microarchitecture may be either symmetric or asymmetric. An example of the latter case would be a chip-level multiprocessor containing a few large, high-performance CPU cores and many small, low-power CPU cores, such as illustrated in FIG. 4.

Usage Models

The following table summarizes a number of usage models for embodiments of the present multithreading architecture extensions:

TABLE 8

| Usage Model | Taxonomy | Description | Benefit |
|---|---|---|---|
| Prefetch | Homogeneous ISA, sequential code, compiler-generated, hint, computation | A helper thread prefetches memory locations in advance of a main thread. The helper thread is generated by the compiler. | Speeds up scalar code with significant time spent in cache misses. |
| Replacement for | Homogeneous ISA, parallel code, | The shreds are used in place of conventional | Speeds up threaded code. Thread |

TABLE 8-continued

| Usage Model | Taxonomy | Description | Benefit |
| --- | --- | --- | --- |
| conventional threads | programmer-generated, architectural, computation | shared-memory threads. A library provides thread services instead of the operating system. | primitives become several orders of magnitude faster. |
| Dedicated execution resources for compiler | Homogeneous ISA, sequential code, compiler-generated, architectural, computation | Compiler creates multiple shreds from scalar source code. | Compiler has direct control over shreds. |
| Dedicated threads for managed runtime environments | Homogeneous ISA, fixed-function, architectural, computation | shreds are dedicated to managed runtime functions. For example, just-in-time translation and garbage collection may be performed using dedicated shreds. | Translation and garbage collection shreds become essentially free. |
| Parallel programming languages | Homogeneous ISA, parallel code, programmer-generated, architectural, computation | Programmer creates parallel code which is compiled into multiple shreds. | Thread primitives are fast enough to be used as instructions. |
| CPU with integrated I/O functions | Heterogeneous ISA, parallel code, programmer generated, architectural, input/output | I/O functions are performed directly by the application program. For example, graphics and network processing. | Enables integration of I/O functionality directly into CPU architecture. |
| Simultaneous Multi-ISA CPU | Heterogeneous ISA, asymmetric uarch, programmer generated, architectural, computation | A single CPU implements multiple ISAs, for example, 32-bit architecture and 64-bit architecture. Each ISA is available to the programmer as a shred. | Interesting possibility, but not likely useful. |
| Asymmetrical core multiprocessor | Homogeneous ISA, asymmetric uarch, architectural, computation | A CMP implements a mix of cores, for example, high performance and low power. | Achieve good scalar and throughput performance. |

Prefetch

In the prefetch usage model, a main thread spawns one or more helper threads which are used to prefetch cache lines from main memory. The helper threads are spawned in response to a cache miss on the main thread. Since a main memory access requires several hundred to a thousand CPU clocks to complete, execution of scalar code will effectively stop during a main memory access unless architectural provisions are made to fault on loads that miss the caches and proceed to main memory.

Replacement for Conventional Threads

Shreds may be used as a high-performance replacement for conventional threads by multithreaded applications. A user-level software library is provided to perform shred management functions (create, destroy, etc) that were formerly performed by the operating system. The library makes use of the shred instructions as well as call the operating system as needed to request additional threads. Calling a software library is much faster than calling the operating system because no context switch is necessary.

Dedicated Execution Resources for Compiler

The compiler may use the shreds in the same manner that it uses other processor resources such as registers. For example, the compiler may view the processor as having 8 integer registers, 8 floating-point registers, 8 SSE registers, and 4 shreds. By treating shreds as a resource, the compiler allocates shreds in an analogous manner to register allocation. As with registers, some mechanism is needed to spill/fill shreds to a backing store in the event that the application program requires more virtual shreds than hardware provides. In prior architectures, the flow of control is usually not regarded as a processor resource because there is only one.

Dedicated Threads for Managed Runtime Environments

In a managed runtime environment, shreds are dedicated to functions such as garbage collection, just-in-time compilation, and profiling. The shreds perform such functions essentially "for free" since the shreds are provided as part of the instruction set architecture (ISA). The ISA is the part of the processor that is visible to the programmer or compiler writer. The ISA serves as the boundary between software and hardware.

Parallel Programming Languages

MAX directly supports parallel programming languages and hardware description languages. For example, an iHDL or Verilog compiler directly generates code for multiple shreds because the source code is explicitly parallel.

The proliferation of threads made possible by chip-level multiprocessors lead to language support for multithreading. Such support is provided through calls to the operating system and run-time library. Language support for multi-threading is migrated into mainstream general-purpose programming languages.

CPU with Integrated I/O Functions

The shreds are used to implement I/O functions such as a network coprocessor. One important difference between a network coprocessor implemented as a shred is that it appears as part of the CPU rather than as an I/O device.

In prior systems, when an application program requires I/O, the application program calls the operating system using an API (application program interface). The operating system in turn calls a device driver which sends the request to the I/O device. The operating system is responsible for queuing or serializing I/O requests from multiple application programs, ensuring that the I/O device processes only one (or a finite number of) requests at a time. This is necessary since the I/O device's state is global to the system, whereas the CPU state is time-multiplexed between multiple applications.

In an I/O device implemented as a heterogeneous shred, the I/O device's state is treated as an extension of the CPU's application state. The application program directly controls both the CPU's application state and the I/O devices state. Both the application state and I/O state is saved/restored by the operating system on a context switch. The I/O device is architected so that its state can be time-multiplexed between several applications without adverse effects.

Simultaneous Multi-ISA CPU

The 64-bit architecture is defined to include the 32-bit architecture application architecture as well as the new 64-bit instruction set through a mechanism known as "seamless". Compatibility with the 32-bit architecture instruction set enables 64-bit architecture processors to run both existing 32-bit architecture applications as well as new 64-bit architecture applications.

Under the current definition, a 64-bit architecture CPU runs either a 64-bit architecture thread or a 32-bit architecture thread at any instant in time. Switching between the two ISAs is accomplished via the 64-bit architecture br.ia (branch to 32-bit architecture) and 32-bit architecture jmpe (jump to 64-bit architecture) instructions. The 32-bit architecture registers are mapped onto the 64-bit architecture registers so that only one copy of the state is needed.

It is possible to create a multi-ISA CPU in which more than one instruction set architecture is running at any instant in time. This may be accomplished by using a shred for the 64-bit architecture ISA and a second shred for the 32-bit architecture ISA. As with homogeneous shreds, distinct application state must be provided for both the 64-bit architecture shred and the 32-bit architecture shred. The 64-bit architecture shred and 32-bit architecture shred run simultaneously.

Having described the features of the present method and system to provide user-level multithreading through the multithreading architecture extensions described above, an embodiment for 32-bit systems is provided below.

back to FIG. 5 to understand an exemplary execution environment, according to one embodiment of the present invention. A small number of instructions are added to the IA-32 ISA along with a number of registers 650-660 to bring the capability of user-level multithreading to IA-32.

The multithreading architecture extension consists of the following state:
  A model specific register 650 (MAX_SHRED_ENABLE) that is used by the operating system or BIOS to enable/disable the extensions.
  Three bits in the CPUID extend feature information that indicate whether the processor implements the extensions and the number of physical shreds available.
  Replication of most of the application state (EAX, EBX, etc) such that each shred has its own private copy of the application state.
  A set of shared registers SH0-SH7 655 that may be used for communication and synchronization between shreds.
  A set of control registers SC0-SC4 660 are used for shred management.

The multithreading architecture extension consists of the following instructions:
  Shred creation/destruction: forkshred, haltshred, killshred, joinshred, getshred
  Communication: mov to/from shared register 655, synchronous mov to/from shared register 655.
  Synchronization (semaphore): cmpxshgsh, xaddsh, xchgsh
  Signaling: signalshred
  Transition to/from multi-shredded mode: entermsm, exitmsm
  State management: shsave, shrestore
  Miscellaneous: mov to/from shred control register In addition, IA-32 mechanisms are provided with the following functionality.
  The IA-32 exception mechanism exits multi-shredded mode and saves all shred state on an exception (when applicable)
  The IA-32 IRET instruction restores all shred state and returns to multi-shredded mode (when applicable)
  A user-level exception mechanism is introduced.

Configuration

A model specific register (MSR) 650 is used to enable the multithreading architecture extension. The MSR is described below.

TABLE 9

| Register Address (Hex) | Register Address (Decimal) | Register Name Fields and Flags | Shared/Unique | Bit Description |
|---|---|---|---|---|
| 1F0H | 496 | MAX_SHRED_ENABLE | Shared | Bit 0 enables the multithreading architecture extension. Initialized to 0 at reset. The operating system or BIOS must explicitly enable MAX by writing a one into this register. |

32-Bit Architecture Embodiment

Although described with reference to the IA-32 architecture, the reader understands that the methods and systems described herein may be applied to other architectures, such as the IA-64 architecture. Additionally, the reader is directed Model-specific registers, such as shred MSR 650, are written and read only at privilege level 0. If the multithreading architecture extensions are not enabled, execution of legacy code is restricted to shred number 0.

TABLE 10

| Initial EAX value | Information provided about the processor |
|---|---|
| 1H | EAX Version Information (Type, Family, Model, and Stepping ID)<br>EBX<br>Bits 7-0: Brand Index<br>Bits 15-8: CLFLUSH line size. (Value .8 = cache line size in bytes)<br>Bits 23-16: Number of logical processors per physical processor.<br>Bits 31-24: Local APIC ID<br>ECX Extended Feature Information<br>EDX Feature Information |

CPUID

The IA-32 CPUID instruction is modified to return an indication that the processor supports the multithreading architecture extension along with a count of the number of physical shreds provided. This is done by adding three bits (NSHRED) to the extended feature information returned in ECX. The information returned by the CPUID Instruction is provided in the following table:

TABLE 11

| Initial EAX value | Information provided about the processor |
|---|---|
| 1H | EAX Version Information (Type, Family, Model, and Stepping ID)<br>EBX<br>Bits 7-0: Brand Index<br>Bits 15-8: CLFLUSH line size. (Value .8 = cache line size in bytes)<br>Bits 23-16: Number of logical processors per physical processor.<br>Bits 31-24: Local APIC ID<br>ECX Extended Feature Information<br>EDX Feature Information |

The Extended Feature Information Returned in the ECX Register has the following form:

TABLE 12

| Bit # | Mnemonic | Description |
|---|---|---|
| 18:16 | NSHRED | Three bits that indicate the number of physical shreds supported by hardware.<br>000: 1 shred/thread<br>001: 2 shreds/thread<br>010: 4 shred/thread<br>011: 8 shreds/thread<br>100: 16 shred/thread<br>101: 32 shreds/thread<br>110: reserved<br>111: reserved |

If the multithreading architecture extension is not enabled (through the MAX_SHRED_ENABLE_MSR), the extended feature information returns a value of 000 for NSHRED.

Architectural State

The multithreading architecture extension places all state into one of three categories.
  Private to each shred
  Shared among local shreds
  Shared among all shreds A breakdown of the IA-32 state into each of the categories is shown above in Table 2. The shred's private state is replicated once per shred. The shred private state is completely private to each shred. Specifically, the architecture does not provide any instructions that individually read or write one shred's private registers from another shred. The architecture does provide the shsave and shrestore instructions to collectively write and read all shred's private state to memory, but these instructions are executed only in single-shredded mode. The shred's shared state is shown in Table 3 above.

A set of shared registers SH0-SH7 655 are used for communication and synchronization between shreds. These registers 655 are written and read through the MOV to shared register and MOV from shared register instructions. The SH0-SH7 registers 655 store 32-bit integer values. According to one embodiment, 80-bit floating point 625 and 128-bit SSE data 640 are shared through main memory.

A set of shred control registers SC0-SC4 660 are provided. These registers are defined as follows.

TABLE 13

| Register | Name | Description |
|---|---|---|
| SC0 | Shred run register | SC0 contains a bit vector with one bit per shred. Bit 0 corresponds to shred 0; bit 1 to shred 1, etc. Each bit indicates whether the associated shred is currently running or halted. When the multithreading architecture extension is disabled through the MAX_SHRED_ENABLE MSR, SC0 contains a value of 1 indicating only shred 0 is active. |
| SC1 | Interrupt shred run register | The contents of SC0 are copied into SC1 when transitioning from multi-shredded to single-shredded mode, and the contents of SC1 are copied into SC0 when transitioning from single-shredded to multi-shredded mode. |
| SC2 | Shred state save/restore pointer | SC2 points to the shred state save/restore area in memory. This memory area is used to save and restore the state of all running shreds on a context switch. |
| SC3 | Shared register empty/full bits | SC3 contains the empty/full bits for the shared registers. Bit 0 corresponds to sh0; bit 1 corresponds to sh1, etc. |
| SC4 | User-level interrupt table base address | SC4 points to the base address for the user-level interrupt table. |

The memory state is shared by all shreds. The breakdown of the EFLAGS register 615 is shown in the table below.

TABLE 14

| Bit | Type | Replicated | Mnemonic | Description |
|---|---|---|---|---|
| 0 | Status | Y | CF | Carry flag |
| 2 | Status | Y | PF | Parity flag |
| 4 | Status | Y | AF | Auxiliary carry flag |
| 6 | Status | Y | ZF | Zero flag |
| 7 | Status | Y | SF | Sign flag |
| 8 | System | Y | TF | Trap flag |
| 9 | System | N | IE | Interrupt enable flag |
| 10 | Control | Y | DF | Direction flag |
| 11 | Status | Y | OF | Overflow flag |
| 13:12 | System | N | IOPL | IO privilege level |
| 14 | System | N | NT | Nested task |
| 16 | System | N | RF | Resume flag |
| 17 | System | N | VM | Virtual 86 mode |
| 18 | System | N | AC | Alignment check |
| 19 | System | N | VIF | Virtual interrupt flag |
| 20 | System | N | VIP | Virtual interrupt pending |
| 21 | System | N | ID | ID flag |

Flags marked "Y" are replicated on a per-shred basis. Flags marked "N" have one copy shared by all shreds.

The 32-bit EFLAGS register 615 contains a group of status flags, a control flag, and a group of system flags.

Following initialization of the processor 105 (either by asserting the RESET pin or the INIT pin), the state of the EFLAGS register 615 is 00000002H. Bits 1, 3, 5, 15, and 22 through 31 of this register 615 are reserved. Software should not use or depend on the states of any of these bits.

Some of the flags in the EFLAGS register 615 can be modified directly, using special-purpose instructions. There are no instructions that allow the whole register to be examined or modified directly. However, the following instructions can be used to move groups of flags to and from the procedure stack or the EAX register: LAHF, SAHF, PUSHF, PUSHFD, POPF, and POPFD. After the contents of the EFLAGS register 615 have been transferred to the procedure stack or EAX register, the flags can be examined and modified using the processor's bit manipulation instructions (BT, BTS, BTR, and BTC).

When suspending a task (using the processor's multitasking facilities), the processor automatically saves the state of the EFLAGS register 615 in the task state segment (TSS) for the task being suspended. When binding itself to a new task, the processor loads the EFLAGS register 615 with data from the new task's TSS.

When a call is made to an interrupt or exception handler procedure, the processor automatically saves the state of the EFLAGS registers 615 on the procedure stack. When an interrupt or exception is handled with a task switch, the state of the EFLAGS register 615 is saved in the TSS for the task being suspended.

Shred Creation/Destruction

A shred may be created using the forkshred instruction. The format is

| forkshred | imm16, target IP |
| forkshred | r16, target IP |

Two forms are provided, one with the shred number as an immediate operand and a second with the shred number as a register operand. For both forms, the target IP is specified as an immediate operand whose value is relative to the beginning of the code segment (nominally 0), not relative to the current IP.

The forkshred imm16, target IP encoding is similar to the far jump instruction with the shred number replacing the 16-bit selector, and the target IP replacing the 16/32-bit offset.

The forkshred instruction sets the appropriate run bit in SC0 and begins execution at the specified address. Unlike the Unix fork( ) system call, the forkshred instruction does not copy the state of the parent shred. A new shred begins execution with an updated EIP along with the current values of all other private registers. It is expected that the new shred should initialize its stack by loading ESP and retrieve incoming parameters from shared registers or memory. The forkshred instruction does not automatically pass parameters.

If the target shred is already running, forkshred raises a #SNA (shred not available) exception. This is a user-level exception as described below. Software either ensures that it is not trying to start an already running shred, or alternatively provide a #SNA handler that halts the existing shred and returns to re-execute the forkshred. A #GP(0) exception is raised if the shred number is greater than the maximum number of shreds supported by hardware.

To terminate execution of the current shred, the haltshred instruction is used. Haltshred clears the current shred's run bit in SC0 and terminates execution of the current shred. The shred's private state is retained even while halted. Since no mechanism exists for one shred to access another shred's private state, a halted shred's private state cannot be seen. However, the state persists and becomes visible when the shred again begins execution via forkshred.

To prematurely terminate execution of another shred, the killshred instruction is introduced. The format is

| killshred | imm16 |
| killshred | r16 |

According to one embodiment, the shred number is a 16-bit register or immediate operand. Killshred clears the specified shred's run bit in SC0 and terminates the shred's execution. While halted, the shred's private state is retained.

If the target shred is not running, killshred is silently ignored. This behavior is necessary to avoid a race between killshred and a normally terminating shred. After executing killshred, software is guaranteed the target shred is no longer running. A shred is allowed to kill itself instead of performing a haltshred. A #GP(0) exception is raised if the shred number is greater than the maximum number of shreds supported by the hardware.

To wait until a specified shred has terminated (as indicated by the SC0 bit being clear), the joinshred instruction is introduced. The format is:

| joinshred | imm16 |
| joinshred | r16 |

If the target shred is not running, joinshred returns immediately. This behavior avoids a race between joinshred and a normally terminating shred. After executing joinshred, software is guaranteed the target shred is no longer running. It is legal (but useless) for a shred to do a joinshred on itself. A #GP(0) exception is raised if the shred number is greater than the maximum number of shreds supported by the hardware. The joinshred instruction does not automatically pass a return value. To allow a shred to determine its own shred number, the getshred instruction is introduced. The format is:

| getshred | r32 |

Getshred returns the number of the current shred. Getshred may be used to access memory arrays indexed by shred number. Getshred zero-extends the 16-bit shred number to write to all bits of the destination register.

For all shred creation/destruction instructions, the shred number may be specified as either a register or immediate operand. It is expected that the execution of the immediate form may be faster than execution of the register form because the shred number will be available at decode time rather than execute time. With the immediate form, the compiler assigns the shred numbers. With the register form, run-time assignment is used.

The following table presents a summary of shred creation/destruction instructions.

TABLE 15

| Instruction | Description |
| --- | --- |
| forkshred imm16, target IP | Begins shred execution at specified address. |
| forkshred r16, target IP | |
| haltshred | Terminates the current shred |
| killshred imm16 | Terminates the specified shred |
| killshred r16 | |
| joinshred imm16 | Waits until the specified shred terminates |
| joinshred r16 | |
| getshred r32 | Returns the number of the current shred |

The forkshred, haltshred, killshred, joinshred, and getshred instructions may be executed at any privilege level. Haltshred is a non-privileged instruction whereas the existing IA-32 hlt instruction is privileged.

It is possible that the execution of a killshred or haltshred results in zero running shreds. This state (with 0 in SC0) is different than the existing IA-32 halt state. SC0==0 is a legal state, but not useful until a user-level timer interrupt is created.

Communication

Shreds communicate with each other through existing shared memory and through a set of registers introduced specifically for this purpose. Shared registers SH0-SH7 655 are accessible by all local shreds belonging to the same thread. The SH0-SH7 registers 655 may be used to pass incoming parameters to a shred, communicate return values from a shred, and perform semaphore operations. A software convention assigns specific shared registers 655 to each purpose.

Each shared register 655 has a corresponding empty/full bit in SC3. To write and read the shared registers 655, MOV to shared register 655 and MOV from shared register 655 instructions are used. These are summarized as follows:

| | |
| --- | --- |
| mov | r32, sh0-sh7 |
| mov | sh0-sh7, r32 |

The instruction encodings are similar to the existing MOV to/from control register 660 and MOV to/from debug register instructions. The MOV to/from shared register instructions may be executed at any privilege level. These instructions assume that software explicitly performs synchronization using additional instructions. The mov to/from shared register instructions neither examine nor modify the state of the empty/full bits in SC3.

It is expected that the latency of MOV to shared register 655 and MOV from shared register 655 will be lower than the latency of loads and stores to shared memory. The hardware implementation is likely to speculatively read the shared registers 655 and snoop for other shreds writes. Hardware must ensure the equivalent of strong ordering when writing to the shared registers 655. In an alternate embodiment, barrier instructions can be created for accessing the shared registers 655.

One architecture feature keeps shared register ordering and memory ordering separate from each other. Thus, if a shred writes to a shared register 655 and then writes to memory 120, there is no guarantee that the shared register 655 contents will be visible before the shared memory contents. The reason for this definition is to enable high-speed access/update of loop counters in the shared registers 655, without creating unnecessary memory barriers. If software requires barriers on both shared registers 655 and memory, software should perform both a shared register semaphore along with a memory semaphore. The memory semaphore is redundant except for acting as a barrier.

To provide rapid communication as well as synchronization, the synchronous mov to/from shared register instructions are used. These instructions are summarized as follows:

| | |
| --- | --- |
| syncmov | r32, sh0-sh7 |
| syncmov | sh0-sh7, r32 |

The instruction encodings parallel the existing MOV to/from control register 660 and MOV to/from debug register instructions. The synchronous mov to shared register 655 is similar to its asynchronous counterpart except that it waits until the empty/full bit indicates empty before writing to the shared register 655. After writing to the shared register 655, the empty/full bit is set to full. The synchronous mov from shared register 655 is similar to its asynchronous counterpart except that it waits until the empty/full bit indicates full before reading from the shared register 655. After reading from the shared register 655, the empty/full bit is cleared to empty.

The empty/full bits may be initialized with a move to SC3 as described below. The synchronous MOV to/from shared register instructions may be executed at any privilege level. The shared register communication instructions are summarized below:

TABLE 16

| Instruction | Description |
| --- | --- |
| mov r32, sh0-sh7 | Move from shared register. |
| mov sh0-sh7, r32 | Move to shared register |
| syncmov r32, sh0-sh7 | Synchronous move from shared register |
| syncmov sh0-sh7, r32 | Synchronous move to shared register |

Synchronization

A set of synchronization primitives operate on the shared registers 655. The synchronization primitives are similar to existing semaphore instructions except that they operate on the shared registers 655 rather than memory. The instructions are as follows.

TABLE 17

| Instruction | Description |
| --- | --- |
| cmpxchgsh sh0-sh7, r32 | Compare shared register with r32. If equal, ZF is set and r32 is loaded into shared register. Else clear ZF and load shared register into EAX. |
| xaddsh sh0-sh7, r32 | Exchange shared register with r32. Then add r32 to shared register. This instruction may be used with the LOCK prefix to enable atomic operation. |
| xchgsh sh0-sh7, r32 | Exchange shared register with r32. This instruction is always atomic. |

The synchronization primitives are executed at any privilege level. These instructions neither examine nor modify the state of the empty/full bits in SC3.

Enter/Exit Multi-shredded Mode

The MAX architecture provides a mechanism to switch between multi-shredded and single-shredded modes. Single-shredded mode enables the processor to perform context switches in an orderly fashion by halting the execution of all but one shred. SC0 indicates the current operating mode as follows:

SC0 containing exactly a single "1" in any bit position implies single-shredded mode
SC0 containing anything other than a single "1" in any bit position implies multi-shredded mode.
To perform a context switch, it is necessary to:
1) Suspend all but one shreds by switching to single-shredded mode
2) Save the shred state
3) Load a new shred state
4) Resume execution of all shreds by switching to multi-shredded mode The entermsm and exitmsm instructions are used to switch to multi-shredded and single-shredded modes, respectively. Entermsm is used to enter multi-shredded mode. The state of all shreds must be loaded prior to execution of this instruction. Entermsm copies the new shred run vector in SC1 into SC0. Entermsm then starts the specified shreds.

It is possible that the contents of SC1 result in no additional shreds being run after execution of entermsm. In this case, the processor remains in single-shredded mode. It is also possible that as a result of executing entermsm, the shred on which entermsm was executed is no longer running. Exitmsm is used to exit multi-shredded mode. Exitmsm copies the present shred execution vector in SC0 into SC1. All SC0 run bits other than the one corresponding to the shred executing exitmsm are cleared. All shreds other than the shred executing exitmsm are halted. These operations are performed as an atomic sequence. The SC0 state indicates single-shredded mode. Entermsm and exitmsm may be executed at any privilege level.

State Management

The instructions (shsave and shrestore) are used to save and restore the collective shred state, to write the contents of all shreds private state to memory, and read the contents of all shreds private state from memory, respectively. The format is

| shsave | m16384 |
|---|---|
| shrestore | m16384 |

The address of the memory save area is specified as a displacement in the instruction. The address is aligned on a 16-byte boundary. The memory save area is 16 KBytes to allow for future expansion. The memory save area extends the existing FXSAVE/FXRESTOR format by adding the integer registers. The memory save area for each shred is defined as follows:

TABLE 18

| Offset | Register |
|---|---|
| 0-1 | FCW |
| 2-3 | FSW |
| 4-5 | FTW |
| 6-7 | FOP |
| 8-11 | FIP |
| 12-13 | CS |
| 14-15 | Reserved |
| 16-19 | FPU DP |
| 20-21 | DS |
| 22-23 | Reserved |
| 24-27 | MXCSR |
| 28-31 | MXCSR_MASK |
| 32-159 | ST0-ST7 |
| 160-287 | XMM0-XMM7 |
| 288-351 | EAX, EBX, ECX, EDX, ESI, EDI, EBP, ESP |

TABLE 18-continued

| Offset | Register |
|---|---|
| 352-359 | ES, FS, GS, SS |
| 360-367 | EIP |
| 368-371 | EFLAGS |

The contents of all shreds are saved/restored at an address given by:

address=512*(shred number)+(base address)

The memory save area includes the EIP and ESP of the currently-running shred. Shsave writes the current EIP and ESP to the memory. To avoid branching, the shrestore instruction does not overwrite the current shred's EIP or ESP. The shrestore function, when executed as part of an IRET, does overwrite the current shred's EIP and ESP.

Shsave and shrestore may by executed at any privilege level, but only while in single-shredded mode. A #GP(0) exception is raised if shsave or shrestore are attempted when in multi-shredded mode. Implementations are free to use all available hardware resources to execute the shsave/shrestore store/load operations in parallel.

Shrestore unconditionally loads the state of all shreds from memory. This behavior is necessary to ensure that a shred's private state does not leak from one task to the next. Shsave may unconditionally or conditionally store the state of all shreds to memory. An implementation may maintain non-architecturally visible dirty bits to skip some or all of the shsave store operations if the private state was not modified.

The shsave and shrestore instructions save and restore only the shred's private state. The operating system is responsible for saving and restoring the shared registers 655.

Move to/from Shred Control Registers 660

Instructions are provided to write and read the shred control registers SC0-SC4 660. These are summarized as follows:

| mov | r32, sc0-sc4 |
|---|---|
| mov | sc0-sc4, r32 |

The instruction encodings are similar to the existing MOV to/from control register 660 and MOV to/from debug register instructions. The MOV to/from shred control register instructions may be executed at any privilege level. Safeguards are provided to ensure that a malicious application program cannot affect any processes other than itself by writing to the shred control registers.

The application program uses forkshred and joinshred rather than manipulating the contents of SC0 directly. Exitmsm can transition from multi-shredded mode to single-shredded mode in an atomic manner. Using mov from SC0 to read the present shred run status and then using mov to SC0 to write a shred run status will not give the desired results because the shred run status may change between the read and the write.

Operating System Exceptions

MAX has several implications for the IA-32 exception mechanism. First, a user-level exception mechanism enables several types of exceptions to be reported directly to the shred that raised them. This mechanism is described below.

Next, the IA-32 exception mechanism is modified to properly handle multiple shreds in the presence of exceptions that require a context switch. One problem with prior IA-32 exception mechanism is that it is defined to automatically save and restore CS, EIP, SS, ESP, and EFLAGS for exactly one running thread.

The existing IA-32 exception mechanism is extended to include the functionality of the entermsm, exitmsm, shsave, and shrestore instructions. When an interrupt or exception is raised that requires a context switch, the exception mechanism does the following:

1) Exit multi-shredded mode by performing an exitmsm. Exitmsm halts all shreds other than the one causing the interrupt or exception. The operating system is entered using the shred that caused the interrupt or exception.
2) Save all shred's current state to memory by performing a shsave at a starting address given by SC2.
3) Perform the IA-32 context switch as presently defined.

To return to a multi-shredded program, a modified IRET instruction performs the following:

1) Performs the IA-32 context switch as presently defined;
2) Restores all shred's current state from memory by performing a shrestore at a starting address given by SC2. This overwrites the EIP and ESP saved in the IA-32 context switch.
3) Enters multi-shredded mode by performing an entermsm. Depending on the state of SC1, the execution of entermsm may cause the processor to remain in single-shredded mode.

The operating system is required to set up the shred state save/restore area in memory and load its address into SC2 prior to performing the IRET. The operating system is also required to save/restore the state of SC1, SC3, and SC4.

It is possible for multiple shreds to simultaneously encounter exceptions that require operating system service. Because the MAX architecture can report only one OS exception at a time, hardware must prioritize OS exceptions across multiple shreds, report exactly one, and set the state of all other shreds to the point where the instruction that raised the exception has not yet been executed.

User-Level Exceptions

MAX introduces a user-level exception mechanism that enables certain types of exceptions to be processed completely within the application program. No operating system involvement, privilege level transition, or context switches are necessary.

When a user-level exception occurs, the EIP of the next yet-to-be executed instruction is pushed onto the stack and the processor vectors to the specified handler. The user-level exception handler performs its task and then returns via the existing RET instruction. According to one embodiment, no mechanism is provided for masking user-level exceptions since it is assumed that the application will raise user-level exceptions only when the application is prepared to service them.

Two instructions are provided to create the first two user-level exceptions: signalshred and forkshred. These are described in the following sections.

Signaling

The signalshred instruction is used to send a signal to a specified shred. The format is:

| signalshred | imm16, target IP |
|---|---|
| signalshred | r16, target IP |

The target shred may be specified as either a register or an immediate operand. The signalshred imm16, target IP instruction encoding is similar to the existing far jump instruction with the shred number replacing the 16-bit selector, and the target IP replacing the 16/32-bit offset. As with the far jump, the signalshred target IP is specified relative to the beginning of the code segment (nominally 0), not relative to the current IP.

In response to a signalshred, the target shred pushes the EIP of the next yet-to-be-executed instruction onto the stack and vectors to the specified address. A shred may send a signal to itself, in which case the effects are the same as executing the near call instruction. If the target shred is not running, signalshred is silently ignored. A #GP(0) exception is raised if the shred number is greater than the maximum number of shreds supported by the hardware.

The signalshred instruction may be executed at any privilege level. The signalshred instruction does not automatically pass parameters to the target shred. No mechanism is provided to block a signalshred. Thus, software may need to either implement a blocking mechanism before issuing a signalshred, or provide a signalshred handler that can nest.

Shred Not Available (SNA)

Forkshred raises a #SNA exception if the program attempts to start a shred that is already running. A software #SNA handler may perform a killshred on the existing shred and return to the forkshred instruction.

The #SNA exception is processed by pushing the EIP of the forkshred instruction onto the stack and vectoring to an address given by SC4+0. The code at SC4+0 should branch to the actual handler. Exception vectors are placed at SC4+16, SC4+32, etc. Software reserves memory up to SC4+4095 to cover 256 possible user-level exceptions. The interrupt table in memory/SC4 mechanism is replaced with a cleaner mechanism at a subsequent time.

Suspend/Resume and Shred Virtualization

The multithreading architecture extension allows user-level software to suspend or resume shreds, using the instructions as follows. To suspend a shred:

1) Initialize the shred state save area in memory. This is a memory area set up by the application program for the suspend action. It is different from the context switch shred state area pointed to be SC2.
2) Send a signal to the shred pointing to the suspend handler. This is done via signalshred target shred, suspend handler IP
3) The suspend handler saves the private state of the shred to memory using existing mov, pusha, and fxsave instructions
4) The suspend handler performs a haltshred
5) The original code performs a joinshred to wait until the shred has halted It is possible that the shred may already be halted at the time of the suspend action. In this case, the signalshred is ignored, the suspend handler is never invoked, and the joinshred does not wait. The shred state save area in memory retains its initial value, which must point to a dummy shred that immediately performs a haltshred. To resume a shred, the reverse operations are performed:

1) Fork a shred pointing to the resume handler. This is done via forkshred target shred, resume handler IP;
2) The resume handler restores the private state of the shred from memory using existing mov, popa, and fxrestor instructions; and
3) The resume handler returns to the shred via the existing RET instruction.

When resuming to a thread that was already halted, the resume handler will RET to a dummy shred that immediately performs a haltshred. The suspend/resume capability opens up the possibility of shred virtualization. Before performing a forkshred, software may choose to suspend any existing shred with the same shred number. After performing a joinshred, software may choose to resume any existing shred with the same shred number. Because the suspend/resume sequences are not re-entrant, a software critical section is necessary to ensure that only one suspend/resume is executed for any given shred at any given time. Using these mechanisms, it is possible for the application program to create its own pre-emptive shred scheduler.

In alternate embodiments of MAX, an instruction exists to fork using the first available shred (allocforkshred r32), where r32 is written with the shred number allocated (in forkshred, r32 specifies the shred number to fork). Allocforkshred also returns a flag indicating if there are any available hardware shreds.

In another embodiment, a wait shred instruction provides wait synchronization using shared registers (waitshred sh0-sh7, imm). The wait instruction provides wait functionality as an instruction. Without this instruction, a loop must be used, such as:

```
loop:  mov  eax, sh0
       and  eax, mask
       jz   loop
```

In another embodiment joinshred is given a bitmask to wait on multiple shreds. Without the bitmask, joinshred waits for one shred to terminate. Multiple joinshreds are required to wait on multiple shreds.

In an alternate embodiment, the killshred is not used. Signalshred followed by joinshred may be used instead of killshred. The signalshred handler consists of the haltshred instruction.

In yet another embodiment it is possible to combine forkshred and signalshred. Forkshred and signalshred differ only in their behavior with regard to whether a shred is currently running or halted. If signalshred is allowed to start a halted shred, signalshred can potentially replace forkshred.

Figure 7:
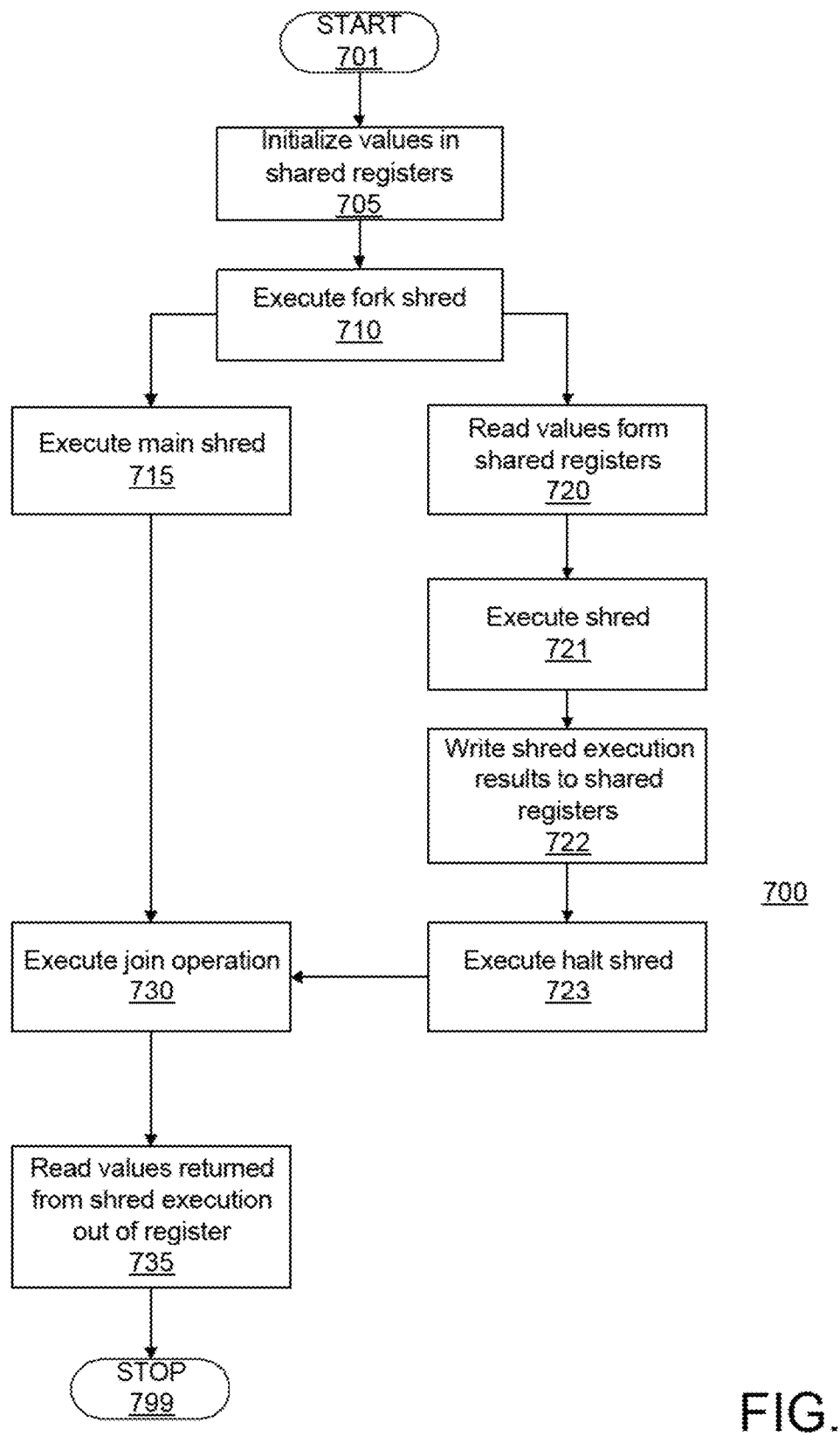
FIG. 7 illustrates a flow diagram of an exemplary process of user-level multithreading, according to one embodiment of the present invention.

FIG. 7 illustrates a flow diagram of an exemplary process of user-level multithreading, according to one embodiment of the present invention. It is assumed that an application or software program initiated the following process. The following process is not described in connection with any particular program, but instead as one embodiment of user-level multithreading achieved by the instructions and architecture described above. Additionally, the following process is performed in conjunction with an ISA of a microprocessor, such as a multiprocessor, whether of 16, 32, 64, 128 or higher bit architecture. A multiprocessor (such as processor 105) initializes values in shared registers, e.g., the registers of table 3 above. (processing block 705) Processor 105 executes a forkshred instruction that creates a shred. (processing block 710) Concurrent operations are performed by processor 105. A main (parent) shred is executed by processor 105. (processing block 715) The join shred operation is executed to wait for the new target shred to complete execution. (processing block 730) Meanwhile, the new target shred initializes it stack, retrieves incoming parameters from shared registers and/or memory (processing block 720) and executes. (processing block 721) The execution of the current target shred is terminated, using the haltshred instruction. (processing block 723) The processor 105 returns execution results to the program or application from the registers in which the shred's execution results are stored. (processing block 735) The process completes once all executed data is returned. (termination block 799)

A method and system to provide user-level multithreading are disclosed. Although the present embodiments of the invention have been described with respect to specific examples and subsystems, it will be apparent to those of ordinary skill in the art that the present embodiments of the invention are not limited to these specific examples or subsystems but extends to other embodiments as well. The present embodiments of the invention include all of these other embodiments as specified in the claims that follow.

We claim:

1. A processor comprising:
a first plurality of cores having first performance and power characteristics;
a second plurality of cores having second performance and power characteristics, different from the first performance and power characteristics;
each of the first and second plurality of cores to support a 64-bit instruction set architecture (ISA) and a 32-bit ISA,
each core of the first and second plurality of cores comprising 64-bit architectural registers to be used when executing both 64-bit ISA instructions of a first thread and 32-bit ISA instructions of a second thread, each core to map 32-bit architectural registers of the 32-bit ISA to one or more of the 64-bit architectural registers during execution of the 32-bit ISA instructions of the second thread;
a first plurality of physical 128-bit registers of a first core to store packed data elements for single instruction multiple data (SIMD) operations of the first thread;
a second plurality of physical 128-bit registers of a second core to store packed data elements for single instruction multiple data (SIMD) operations of the second thread;
a first plurality of control registers of the first core to store one or more variables related to a current execution state of the first thread; and
a second plurality of control registers of the second core to store one or more variables related to a current execution state of the second thread.

2. The processor of claim 1 wherein the first core is to switch from executing the 64-bit ISA instructions of the first thread to executing 32-bit ISA instructions of another thread responsive to execution of a first instruction.

3. The processor of claim 1 further comprising:
execution circuitry to execute a first instruction of the first thread to cause the first thread to wait until a second instruction is executed before resuming execution of the first thread.

4. The processor of claim 3, wherein the second instruction is from the second thread.

5. The processor of claim 4 wherein the first thread is to resume execution following execution of the second instruction, using at least one value accessed and/or modified during execution of the second thread.

6. The processor of claim 5 wherein the at least one value is to be stored by the second thread in a first memory location or a first register shared by the first and second threads.

7. The processor of claim 6 wherein a shared register semaphore is implemented to share the first register and/or a shared memory semaphore is implemented to share the first memory location.

8. The processor of claim 3 wherein the execution circuitry is further to execute a third instruction of a third thread to cause the third thread to wait until a fourth instruction of a fourth thread is executed before resuming execution of the third thread.

9. The processor of claim 8, wherein the third thread is to resume execution following execution of the fourth instruction, using at least one value accessed during execution of the fourth thread.

10. The processor of claim 9 wherein, in response to a context switch, the execution circuitry is to execute a context save instruction to save a state associated with the third thread in a region of memory allocated to the third thread.

11. The processor of claim 10 wherein the execution circuitry is to execute a context restore instruction to restore the state and to continue execution of the third thread.

12. The processor of claim 11 wherein the state comprises a first plurality of values associated with the third thread that are not shared with one or more other threads and a second plurality of values shared with the one or more other threads, the one or more other threads including the fourth thread.

13. The processor of claim 12 wherein the second plurality of values are shared within a memory subsystem including at least one cache.

14. The processor of claim 1 wherein the first and second plurality of control registers include a first and second control register, respectively, to store first and second base addresses of first and second regions in memory, respectively, for storing first and second interrupt data associated with the first and second threads, respectively.

15. The processor of claim 1 wherein each of the first and second plurality of cores comprises circuitry to implement a virtual execution environment comprising a virtual machine monitor (VMM).

16. The processor of claim 15 wherein the VMM is to detect an execution of a privileged instruction by a virtual machine and to service the privileged instruction.

17. The processor of claim 1 wherein the first plurality of cores comprise the first core and the second plurality of cores comprise the second core.

18. The processor of claim 1 wherein the first plurality of cores comprise the second core and the second plurality of cores comprise the first core.

* * * * *